US008850573B1

(12) United States Patent
Chen et al.

(10) Patent No.: US 8,850,573 B1
(45) Date of Patent: Sep. 30, 2014

(54) COMPUTING DEVICE WITH UNTRUSTED USER EXECUTION MODE

(75) Inventors: J. Bradley Chen, Los Gatos, CA (US); Bennet S. Yee, Mountain View, CA (US); David C. Sehr, Cupertino, CA (US)

(73) Assignee: Google Inc., Mountain View, CA (US)

( * ) Notice: Subject to any disclaimer, the term of this patent is extended or adjusted under 35 U.S.C. 154(b) by 363 days.

(21) Appl. No.: 12/886,960

(22) Filed: Sep. 21, 2010

Related U.S. Application Data

(60) Provisional application No. 61/324,260, filed on Apr. 14, 2010.

(51) Int. Cl.
| | |
|---|---|
| *H04L 29/06* | (2006.01) |
| *G06F 12/14* | (2006.01) |
| *G06F 7/04* | (2006.01) |
| *G06F 17/30* | (2006.01) |
| *H04N 7/16* | (2011.01) |
| *G06F 17/00* | (2006.01) |
| *G06F 12/16* | (2006.01) |
| *G06F 11/00* | (2006.01) |
| *G08B 23/00* | (2006.01) |

(52) U.S. Cl.
USPC .................................. 726/22; 726/1; 726/26

(58) Field of Classification Search
USPC ........................................................ 726/22
See application file for complete search history.

(56) References Cited

U.S. PATENT DOCUMENTS

| | | | | |
|---|---|---|---|---|
| 5,483,649 | A * | 1/1996 | Kuznetsov et al. ............. | 726/22 |
| 5,574,927 | A * | 11/1996 | Scantlin ........................ | 712/41 |
| 5,627,987 | A * | 5/1997 | Nozue et al. .................. | 711/200 |
| 5,678,556 | A * | 10/1997 | Maki et al. .................... | 600/477 |
| 5,958,050 | A * | 9/1999 | Griffin et al. ..................... | 726/1 |
| 5,974,549 | A * | 10/1999 | Golan ............................. | 726/23 |
| 6,128,774 | A * | 10/2000 | Necula et al. ................. | 717/146 |
| 6,275,938 | B1 * | 8/2001 | Bond et al. ..................... | 726/23 |
| 6,317,868 | B1 * | 11/2001 | Grimm et al. ................. | 717/127 |
| 6,505,300 | B2 * | 1/2003 | Chan et al. .................... | 713/164 |
| 6,618,855 | B1 * | 9/2003 | Lindholm et al. ............. | 717/126 |
| 6,745,306 | B1 * | 6/2004 | Willman et al. ............... | 711/163 |
| 6,871,283 | B1 * | 3/2005 | Zurko et al. ................... | 726/10 |
| 6,883,098 | B1 * | 4/2005 | Roman et al. ................... | 726/5 |

(Continued)

OTHER PUBLICATIONS

Yee, B. et al., "Native Client: A Sandbox for Portable, Untrusted x86 Native Code," 2009 IEEE Symposium on Security and Privacy, 15 pages.

*Primary Examiner* — Melvin H Pollack
(74) *Attorney, Agent, or Firm* — Fish & Richardson P.C.

(57) ABSTRACT

Methods and apparatus for executing untrusted application code are disclosed. An example apparatus includes an execution mode state indicator with a plurality of states. In the example apparatus, the execution mode state indicator is configured such that placing the execution mode state indicator in a first state causes the processor to operate in a first execution mode and placing the execution mode state indicator in a second state causes the processor to operate in a second execution mode. The example apparatus also includes an instruction processing module that is configured to implement a set of instructions in the first execution mode and designate one or more instructions of the set of instructions as illegal instructions in the second execution mode. The example apparatus further includes a memory system that, in the second execution mode, is configured to restrict access to a set of memory addresses accessible by the processor in the first execution mode to a subset of the set of memory addresses.

38 Claims, 15 Drawing Sheets

(56) References Cited

U.S. PATENT DOCUMENTS

| | | | |
|---|---|---|---|
| 6,907,608 B1 * | 6/2005 | Susser et al. | 719/315 |
| 6,910,209 B2 * | 6/2005 | Kawahara et al. | 718/102 |
| 7,086,060 B2 * | 8/2006 | Hahn | 718/104 |
| 7,225,448 B2 * | 5/2007 | Himmel et al. | 719/318 |
| 7,272,832 B2 * | 9/2007 | Gardner | 718/105 |
| 7,509,639 B2 * | 3/2009 | Worley, Jr. | 718/1 |
| 7,543,293 B2 * | 6/2009 | Willman | 718/100 |
| 7,555,775 B2 * | 6/2009 | Smith | 726/22 |
| 7,673,109 B2 * | 3/2010 | Wrighton et al. | 711/163 |
| 7,783,920 B2 * | 8/2010 | Mall et al. | 714/15 |
| 8,219,772 B2 * | 7/2012 | Smith et al. | 711/163 |
| 2001/0018731 A1 * | 8/2001 | Fujii et al. | 711/170 |
| 2007/0006294 A1 * | 1/2007 | Hunter | 726/14 |
| 2008/0288789 A1 * | 11/2008 | Harris et al. | 713/193 |
| 2009/0282474 A1 * | 11/2009 | Chen et al. | 726/21 |
| 2009/0282477 A1 | 11/2009 | Chen et al. | |
| 2011/0029820 A1 | 2/2011 | Sehr et al. | |
| 2011/0029961 A1 | 2/2011 | Muth et al. | |

* cited by examiner

| | KERNEL | TRUSTED | UNTRUSTED | FURTHER-RESTRICTED UNTRUSTED |
|---|---|---|---|---|
| INSTRUCTION 1 | LEGAL | ILLEGAL | ILLEGAL | ILLEGAL |
| INSTRUCTION 2 (E.G. SYSCALL) | LEGAL | LEGAL | ILLEGAL | ILLEGAL |
| INSTRUCTION 3 | LEGAL | LEGAL | LEGAL | ILLEGAL |
| INSTRUCTION 4 | LEGAL | LEGAL | LEGAL | LEGAL |
| INSTRUCTION 5 | LEGAL | LEGAL | CHANGED | CHANGED |
| ... | ... | ... | ... | ... |
| INSTRUCTION N | LEGAL | LEGAL | LEGAL | LEGAL |

COMPUTING DEVICE WITH UNTRUSTED USER EXECUTION MODE

CROSS-REFERENCE TO RELATED APPLICATIONS

This application claims the benefit, under 35 U.S.C. §119 (e), of U.S. Provisional Patent Application Ser. No. 61/324,260, filed on Apr. 14, 2010. The disclosure of U.S. Provisional Patent Application Ser. No. 61/324,260 is incorporated by reference herein in its entirety.

TECHNICAL FIELD

This application relates in general, to computer security. More specifically, this application relates to methods and apparatus for safely executing untrusted code.

BACKGROUND

Traditionally, personal computing hardware and software systems followed a model where trust decisions about software installed and run on such computer hardware were made explicitly by users of such systems. For instance, a user would install software by inserting a compact disk (CD) or other computer readable medium into his or her computer system. In such approaches, the user was responsible for the safety of the installed software, and for making decisions that the installed software did not contain malicious code, such as computer viruses, spyware, or other malicious software (malware).

This traditional trust model for software applications is no longer applicable when such software applications are delivered to computing systems via the Internet or the World Wide Web via, for example, a web browser, or via other mechanisms, such as described herein. As an application platform, the modern web browser brings together a remarkable combination of resources, including seamless access to Internet resources, including access to a wide variety of application software. This approach, however, creates the opportunity for malicious software/code to be easily delivered to, and installed on a user's computing system.

One problem with delivery of software applications (executable content) in these manners is that such content may easily exhibit malicious behavior (e.g., corrupting a computing system). Two common approaches to prevent programs from expressing such malicious behavior are interpreted languages, such as JavaScript and type-safe languages, such as C# and Java. In these approaches, the languages are designed in such a way that certain dangerous constructs are excluded, such that said constructs cannot be used to express a malicious operation. Examples of dangerous constructs include inline assembler, self-modifying code, type casts, pointer arithmetic, and traditional malloc/free heap management. While improving program safety, these restrictions also tend to impact performance and developer productivity and preferences.

In the case of interpreter-based language implementations, safety relies on correct (e.g. bug-free) implementation of the interpreter. In the case of language implementations that use a bytecode language or intermediate representation, safety typically relies on the correct implementation of the bytecode compiler or interpreter. These compilers and interpreters are commonly large and complex software systems, and are rarely defect free. As such, they constitute a large attack surface for an attacker.

One approach that is used to overcome the performance limitations of using interpreted languages for browser-based applications is the use of various extension mechanisms such as ActiveX and NPAPI plug-in environments. Such plug-in environments allow native code (e.g., machine instructions of the specific computing system) to be loaded and run in a browser as part of a web (browser-based) application. While such architectures allow browser-based applications to achieve the computational performance characteristics of native applications, they do so at expense of allowing the browser-based applications to circumvent the security mechanisms otherwise applied to web content using, for example, interpreted languages and/or secure runtime environments.

Google Native Client provides computer users protection from malicious code using measures, such as validating and isolating or "software-sandboxing" native client code, which allow native code to be run within a browser in a secure and safe fashion. Such methods have been described, for example, in the following applications, all of which are hereby incorporated by reference in their entirety: "Method for Validating an Untrusted Native Code Module," application Ser. No. 12/117,634, filed May 8, 2008; "Method for Safely Executing an Untrusted Native Code Module on a Computing Device," application Ser. No. 12/117,650, filed May 8, 2008; "Native Code Module Security for ARM Instruction Set Architectures," application Ser. No. 12/621,286 filed Nov. 18, 2009, and "Native Code Module Security for 64-bit Instruction Set Architectures, application Ser. No. 12/621,266 filed on Jul. 31, 2009.

SUMMARY

In a first general aspect, an example method includes receiving, at a processor, a request to run executable application code using a reduced level of trust in a computing system in which the processor is implemented. The example method further includes, in response to receiving the request, changing an execution mode of the processor from a first execution mode to a second execution mode. The example method also includes, in response to changing the execution mode from the first execution mode to the second execution mode, performing, by the processor, at least one of modifying an instruction set of the processor to designate one or more instructions that are legal in the first execution mode as being illegal; and restricting access to memory accessible by the processor in the first execution mode to a subset of the memory.

In a second general aspect, an example apparatus includes an execution mode state indicator with a plurality of states. In the example apparatus, the execution mode state indicator is configured such that placing the execution mode state indicator in a first state causes the processor to operate in a first execution mode and placing the execution mode state indicator in a second state causes the processor to operate in a second execution mode. The example apparatus also includes an instruction processing module that is configured to implement a set of instructions in the first execution mode and designate one or more instructions of the set of instructions as illegal instructions in the second execution mode. The example apparatus further includes a memory system that, in the second execution mode, is configured to restrict access to a set of memory addresses accessible by the processor in the first execution mode to a subset of the set of memory addresses.

BRIEF DESCRIPTION OF THE DRAWINGS

FIG. 4 is a table illustrating modification of an instruction set of a processor for various execution modes in accordance with an example embodiment.

Like reference symbols in the various drawings indicate like elements.

DETAILED DESCRIPTION

Figure 1:
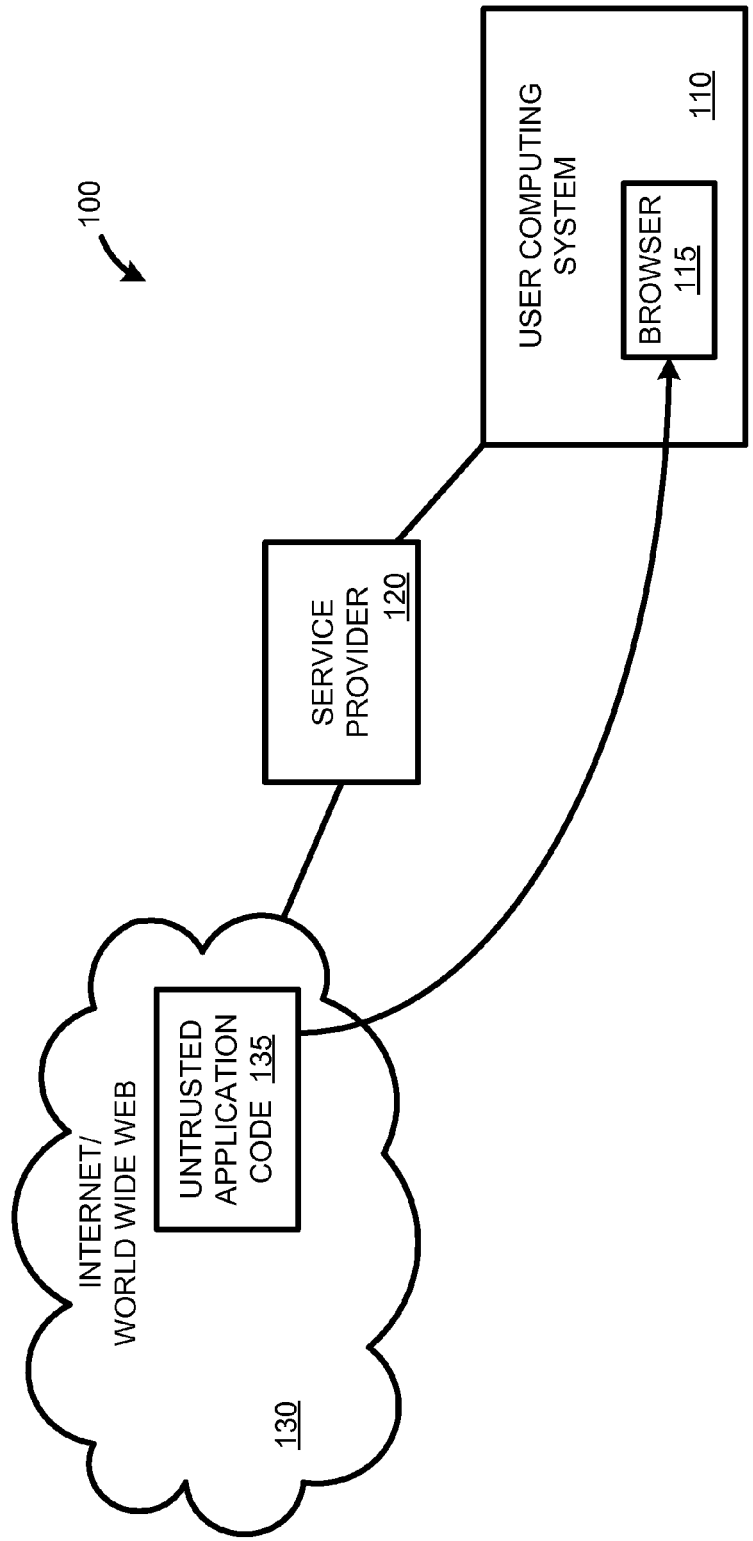
FIG. 1 is a block diagram illustrating an approach for delivery of "untrusted" executable application code via a browser in accordance with an example embodiment.

FIG. 1 is a block diagram illustrating a network 100 that may be used to deliver "untrusted" executable application code 135 to a user computing system 110 for execution on the computing system 110. For purposes of this disclosure, "untrusted" executable application code (or "untrusted code") may refer to executable code that is provided to a computing system via an "untrusted source." The determination of whether executable code is "trusted" or "untrusted" will depend on the particular embodiment. For instance, in the example embodiment shown in FIG. 1, untrusted code 135 is provided to the computing system 110 via the browser application 115, such as from a website that is located on a network, such as the Internet or World Wide Web (WWW) 130. For instance, a user may obtain the untrusted code 135 using the browser application 115 that is running on the user computer system 110. It will be appreciated that untrusted code could be acquired in other manners, such as using File Transfer Protocol (FTP) or other mechanism for retrieving the untrusted code 135 from a network location. In other instances, untrusted code 135 code may be provided in other fashions that do not involve a network connection, such as from an external drive or other source that is external to the computing system 110. In still other situations, "untrusted code" could be delivered to the computing system along with "trusted code," such as along with an application purchased via an online store.

In contrast, "trusted" code, for purposes of this disclosure, may refer to executable application code that is installed locally on the computing system 110, such as code installed on a hard drive of the computing system by a user of the computing system. In this situation, the user would assume responsibility for determining whether such locally installed code contains any malicious code, such as spyware, computer viruses or other malicious software (which may be collectively referred to as "malware"). This is in contrast to Web-based applications where the Web browser is responsible for protecting users from malicious content.

In other embodiments, trusted code may be executable application code that is installed on the computing system 110 during manufacture of the computing system 110, such as the browser 135. Such trusted code may be referred to as "trusted host applications" or "trusted applications." In this instance, a manufacturer of the computing system 110 would be responsible for determining that such locally installed executable application code is free of malware. In such an approach, any other executable code run on the computing system 110 may be treated as untrusted.

In the particular example shown in FIG. 1, a user of the computing system 110 may access the Internet or WWW 130 via a service provider 120. Using the browser 115, the user may navigate to a website or Internet location from which the untrusted application code 135 can be acquired. In an example embodiment, the user may click or follow a link (e.g., hyperlink) in order to retrieve the untrusted code 135. As shown in FIG. 1, the untrusted code 135 may then be delivered to the browser 115, e.g., via the service provider 120, for execution by the computing system 110. In order to protect the user computing system 110 from the negative effects of malware without any significant impact to performance of the computing system 110, the computing system 110 may execute the untrusted code 135 in an untrusted execution mode, such as described herein. Again, the network 100 is merely an example of one approach for obtaining untrusted code and other approaches, such as those discussed above, may be used to determine whether executable code is trusted or untrusted.

Also, in certain situations, the computing system may operate in a further-restricted untrusted execution mode while executing the untrusted code 135. For instance, the computing system 110 may switch from the untrusted execution mode to the further-restricted untrusted execution mode in situations where the untrusted code generates or uses runtime generated code. For instance, the further-restricted untrusted execution mode may be used to execute code that is dynamically generated or accessed by the untrusted code 135 (e.g., just-in-time code or code in dynamically linked libraries that are called by the untrusted code 135). Of course, other situations may cause the computing system 110 (or a processor of the computing system) to switch from the untrusted execution mode to the further-restricted untrusted execution mode.

Figure 2:
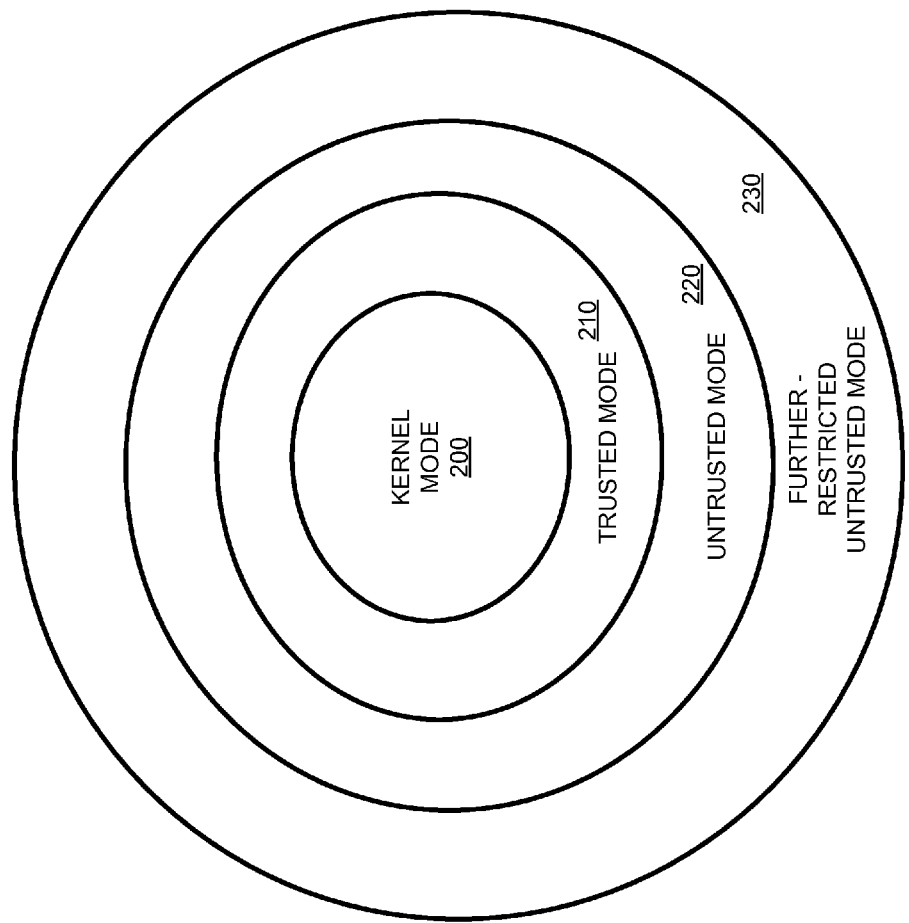
FIG. 2 is a diagram illustrating execution modes of a processor and/or computing system in accordance with an example embodiment.

FIG. 2 is a diagram illustrating a plurality of execution modes that may be implemented by a processor using the techniques described herein. In FIG. 2, the execution modes are shown in increasing levels of trust moving from the outer portion of the diagram to the center of the diagram. While the diagram shown in FIG. 2 includes four trust levels, in other embodiments, a different number of trust levels may be used. For instance, in one embodiment, three trust levels may be used, while in other embodiments five or more trust levels may be used.

In the example shown in FIG. 2, the highest level of trust is kernel mode 200. In kernel mode 200, a processor has unrestricted access to the resources of a computing system in which it is implemented. For instance, in kernel mode 200, a processor may setup, modify or remove memory segments, or memory pages in a memory system of the processor. Such segments/pages may correspond with respective portions of memory storage devices that are operationally coupled with the processor, such as random access memory devices used to implement system memory for a computing system.

In FIG. 2, the trusted execution mode 210 has the next-highest level of trust, as compared to the kernel mode 200. In the trusted execution mode 210, a processor of a computing system is restricted in its actions as compared to the kernel mode 200. For instance, the processor may not create memory segments or pages in the trusted execution mode 210. However, in the trusted execution mode 210, the processor still has access to the resources of the computing system and may invoke an operating system (O/S) of the computing system in which it is implemented and also may have other capabilities that are not available in the kernel mode 200. A trusted code base (e.g., locally installed trusted executable application code) would be run in the trusted execution mode 210. Such a trusted code base could be stored using a non-volatile mass storage device of the computing system, such as using a hard disk drive or a flash drive, as two examples. However, because the processor, when operating in the trusted execution mode 210, is able to invoke the O/S of its computing system and access resources of its computing system, untrusted code, if run in the trusted user mode 210, may easily place malware on a computing system by using instructions that invoke an O/S of the computing system.

In order to prevent such malware from being placed on a user computing system, the processor may operate in an untrusted execution mode 220, such as described in further detail below, when executing untrusted code (e.g., such as application code 135). In the untrusted execution mode 220, instructions of the processor's instruction set that invoke the O/S of a computing system, and/or access resources of the computing system may be illegal when the processor is operating in the untrusted execution mode 220. Additionally or alternatively, the processor may restrict access to memory locations when operating in the untrusted execution mode 220, so as to prevent untrusted code from placing malware into system memory that could then be executed when the processor returns to the trusted execution mode 210. Such approaches may be advantageous as they may reduce security risks associated with software defects, where such defects may provide malicious actors with a mechanism to improperly invoke an O/S in order to corrupt or place malware on a user's computing system.

In certain situations, such as those described above with respect to FIG. 1, a processor may be configured to operate in a further-restricted untrusted execution mode 230. In the further-restricted untrusted execution mode 230, additional instructions of the processor may be designated as illegal to further reduce the risk of malware being placed on the computing system. For instance, the processor may be configured to operate in the further-restricted untrusted execution mode 230 when untrusted code attempts to execute dynamically generated code (e.g., just-in-time code, or runtime generated code). Of course, other situations may cause a processor to operate in the further-restricted untrusted execution mode 230, depending, at least in part, on the particular embodiment. Additionally or alternatively, access to memory may be more restricted in the further-restricted untrusted execution mode as compared the untrusted execution mode.

In the example shown in FIG. 2, as a processor transitions between the trusted execution mode 210, the untrusted execution mode 220 and the further-restricted untrusted execution mode 230, the capabilities of the processor may monotonically decrease at each reduced level of trust. For instance, when transitioning from the trusted execution mode 210 to the untrusted execution mode 220, the processor may be configured to designate at least one instruction that is legal in the trusted execution mode 210 as being illegal in the untrusted execution mode 220. Alternatively or in addition to making at least one instruction illegal, when transitioning from the trusted execution mode 210 to the untrusted execution mode 220, the processor may be configured to designate at least one memory location that is accessible in the trusted execution mode 210 as protected in the untrusted execution mode 220. The capabilities of the processor may be similarly reduced when transitioning from the untrusted execution mode 220 to the further-restricted untrusted execution mode 230 or from a higher level of trust to a lower level of trust.

Figure 3:
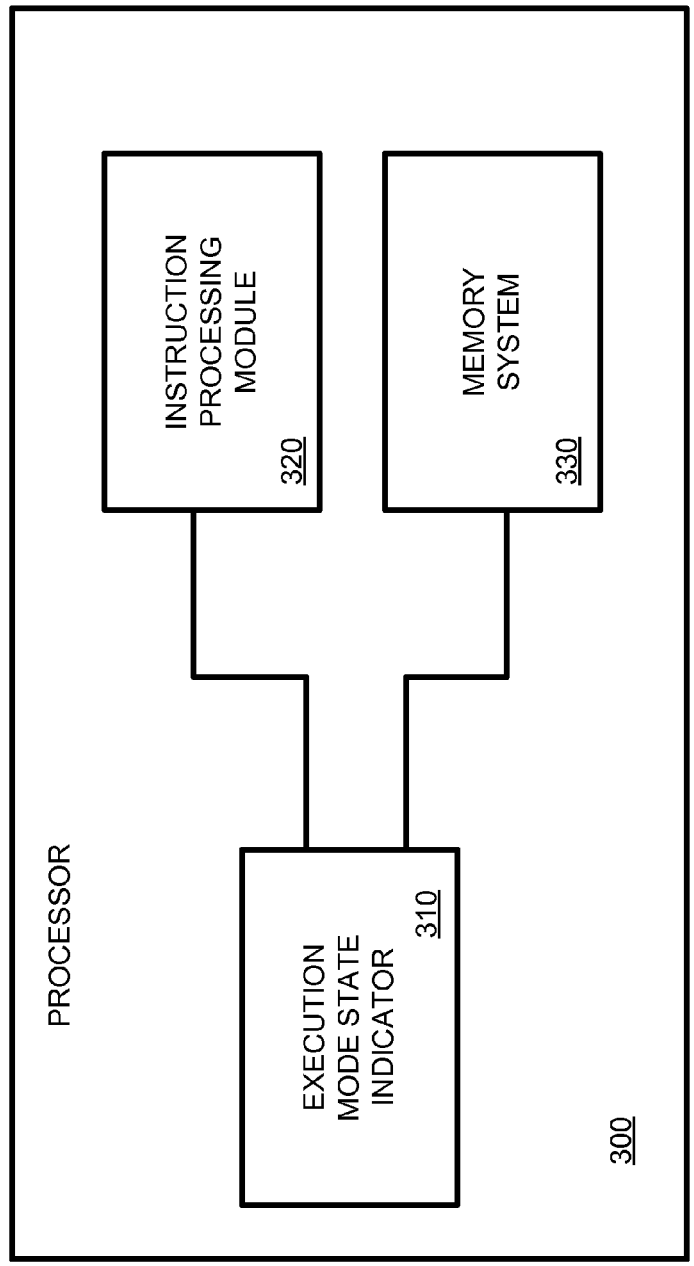
FIG. 3 is a block diagram of a processor in accordance with an example embodiment.

FIG. 3 is a block diagram of a processor 300 that may be used to implement the various execution modes illustrated in FIG. 2. As shown in FIG. 3, the processor 300 includes an execution mode state indicator 310. In the processor 300, the execution mode state indicator 310 may be configured to indicate a current execution mode of the processor, such as one of the execution modes discussed above with respect to FIG. 2. In an example embodiment, the execution mode state indicator 310 may be implemented by a register, such as an execution mode state register or other appropriate mechanism for maintaining execution mode state information for the processor 300. Of course, the execution mode state indicator 310 may be implemented in any appropriate fashion, depending on the particular embodiment and the processor architecture which is being used to implement the various execution states described herein.

In order for the processor 300 to implement the execution modes discussed above with respect to FIG. 2, the execution mode state indicator 310 should have at least four possible states. In such an embodiment, when the execution mode state indicator 310 is in a first state, the processor 300 may operate in the kernel mode 200. In this example embodiment, when the execution mode state indicator 310 is in a second state, the processor 300 may operate in the trusted execution mode 210; when the execution mode state indicator 310 is in a third state, the processor 300 may operate in the untrusted execution mode 220; and when the execution mode state indicator 310 is in a fourth state, the processor 300 may operate in the further-restricted untrusted execution mode 230. Of course, other approaches for indicating an execution state for the processor 300 are possible and fewer or more execution states may be implemented, depending on the particular embodiment.

As shown in FIG. 3, the execution mode state indicator 310 may be coupled with other blocks of the processor 300. In such an approach, the various blocks of the processor 300 may use a value stored in the execution mode state indicator 310 (or other state information) to modify the operation of the processor 300 in correspondence with an indicated execution state, such as to implement one of the execution modes discussed above with respect to FIG. 2. As shown in FIG. 3, the execution mode state indicator 310 may be coupled with an instruction processing module 320 of the processor 300 and may also be coupled with a memory system 330 of the processor 300 in order to provide execution state information to the instruction processing module 320 and the memory system 330.

In the processor 300, when the execution mode state indicator 310 indicates that the processor should operate in the untrusted execution mode 220, the instruction processing module 320 of the processor 300 may designate one or more instructions of a trusted execution mode instruction set as illegal in the untrusted execution mode 220. For instance, the instruction processing module 320 may designate instructions that invoke an O/S of a computing system in which the processor 300 is implemented as illegal. Such instructions may include syscall instructions, far-call instructions, inter-segment instructions, instructions that modify segment state and/or instructions that directly access resources of the computing system. In such an approach, a fault or exception may be raised in the processor 300 if any such instructions are included in untrusted code and attempt to execute while the processor is operating in the untrusted execution mode 220. In addition to raising a fault or an exception, in an example embodiment, a computing system in which the processor 300 is implemented may be configured to terminate execution of untrusted code if an attempt is made to execute an instruction that is designated as illegal while executing the untrusted code in the untrusted execution mode. Additionally, an O/S of the computing system may be used to process and handle the error, which may include determining where control-flow should resume after the error. In this example, the untrusted code process may be terminated by the O/S, such as by an error or fault handler.

In the processor 300, if the execution mode state indicator 310 indicates that the processor 300 should operate in the further-restricted untrusted execution mode 230, the instruction processing module 320 may be further configured to designate one or more additional instructions of the trusted execution mode 210 set of instructions (in addition to the instructions designated as illegal in the untrusted execution mode 220) as illegal instructions in the further-restricted untrusted execution mode 230. In similar fashion as discussed above, attempting to execute an instruction that is designated as illegal in the further-restricted untrusted execution mode 230 may cause a fault or exception to be raised in the processor 300 and execution of the untrusted code to be terminated by the computing system. Example approaches for restricting an instruction set of the processor 300 for the various execution modes described herein are discussed in further detail with respect to FIGS. 4 and 5.

Also in the processor 300, when the execution mode state indicator 310 indicates that the processor should operate in the untrusted execution mode 220, the memory system 330 of the processor 300 may restrict access by the processor 300 to a subset of memory (of a computing system) that is accessible by the processor 300 when operating in the trusted execution mode 210. Further, when the execution mode state indicator 310 indicates that the processor should operate in the further-restricted untrusted execution mode 230, the memory system 330 of the processor 300 may restrict access by the processor 300 to a further subset of memory of the computing system that is accessible by the processor 300 when operating in the trusted execution mode 210 or a subset of the memory accessible by the processor 300 when operating in the untrusted execution mode 220.

Figure 6:
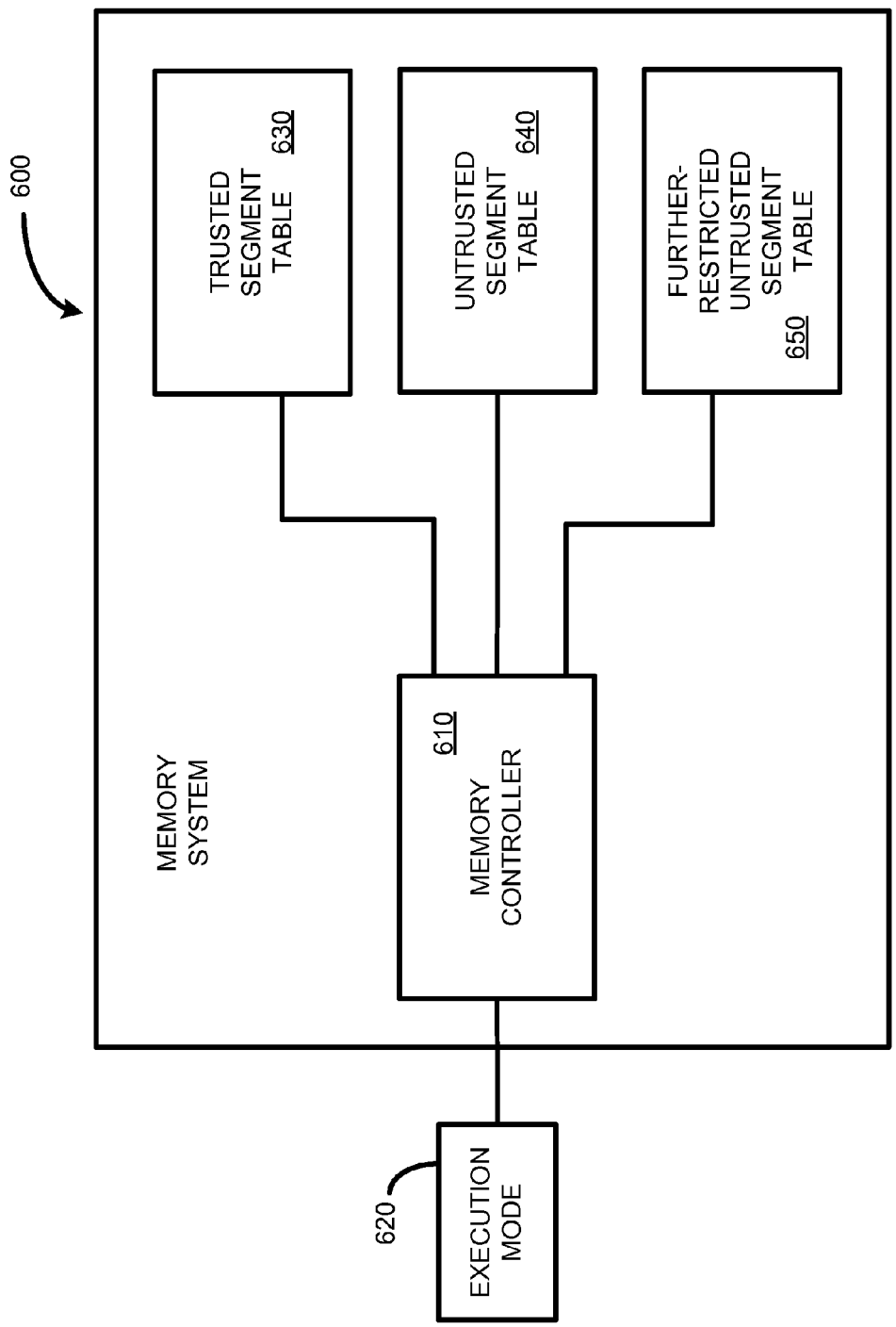
FIG. 6 is a block diagram illustrating a memory system of a processor in accordance with an example embodiment.

Depending on the particular embodiment, a number of approaches may be used to define the subset of memory that is accessible by the processor in the untrusted execution mode 220. For instance, if the processor 300 uses memory segmentation to allocate memory, the memory system 330 of the processor 300 may restrict memory access in the untrusted execution mode 220 to a subset of memory segments that are accessible by the processor 300 in the trusted execution mode 210. An example of such an approach is illustrated in FIG. 6 and is discussed in further detail below.

Figure 7:
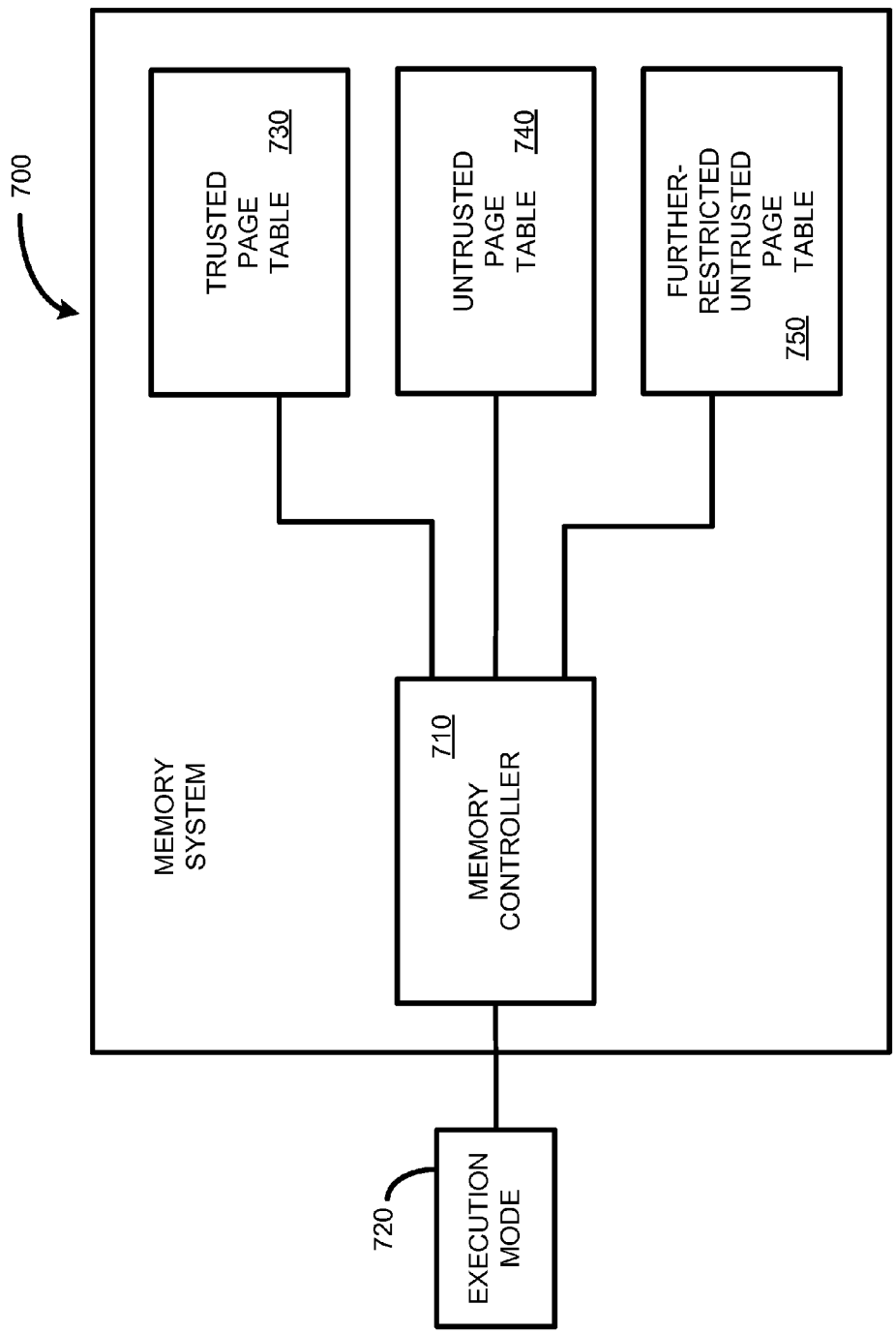
FIG. 7 is a block diagram illustrating a memory system of a processor in accordance with another example embodiment.

In another example embodiment, the processor 300 may use memory pages to define blocks of memory locations that are accessible by the processor 300. In such an approach, the memory system 330 may restrict memory access in the untrusted execution mode 220 to a subset of memory pages that are accessible to the processor in the trusted execution mode 210. Such an approach is illustrated in FIG. 7 and is discussed in further detail below.

Figure 8:
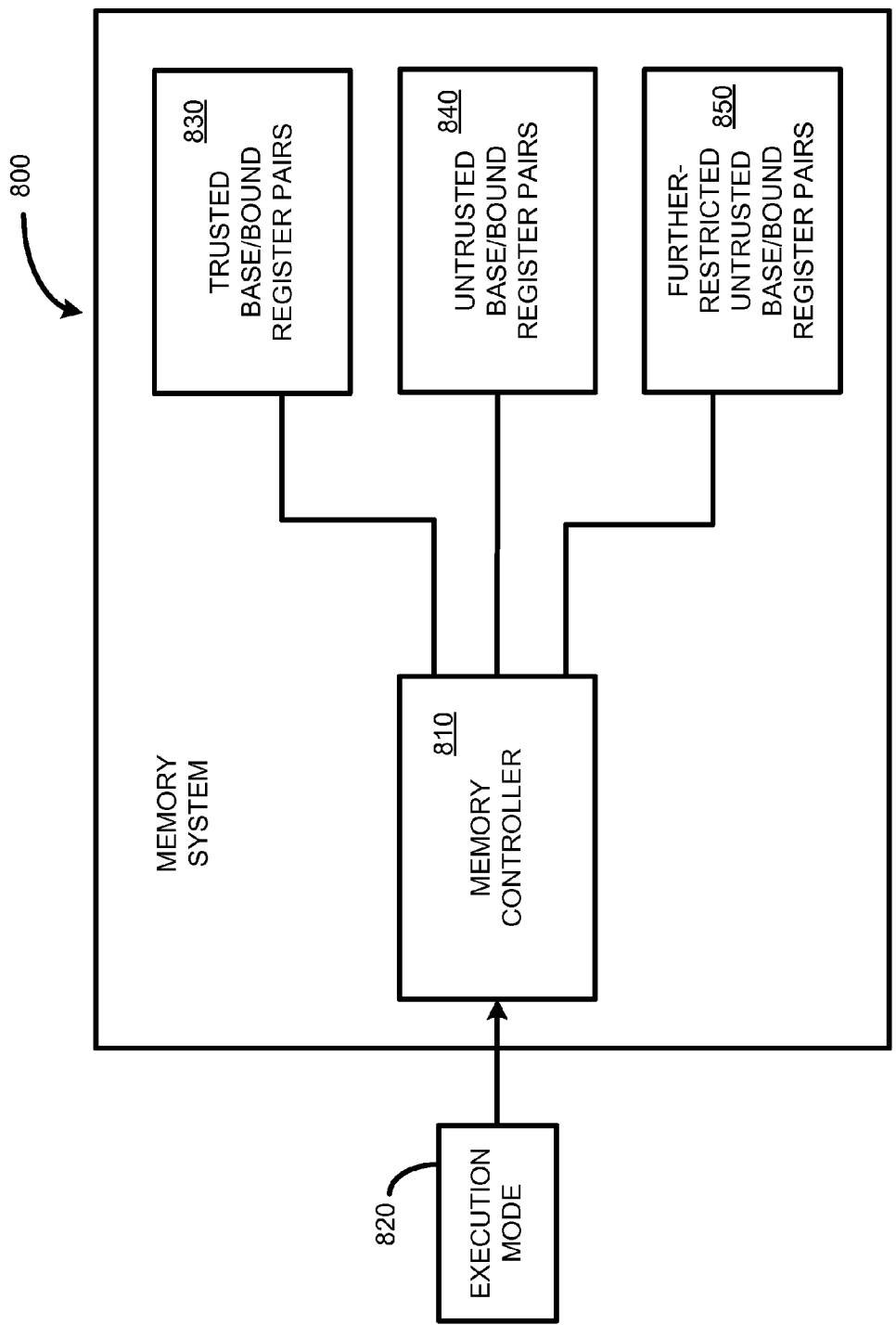
FIG. 8 is a block diagram illustrating a memory system of a processor in accordance with yet another example embodiment.

In yet another example, the processor may use base/bound register pairs to define memory ranges that are accessible to the processor 300. In such an approach, the processor 300 may include one or more respective base/bound register pairs for each execution mode to define the memory ranges that are accessible by the processor 300 in a given execution mode. For instance, base/bound register pairs for the untrusted execution mode 220 may define memory ranges that are a subset of the memory ranges that are accessible by the processor 300 in the trusted execution mode 210. Such an approach is illustrated in FIG. 8 and is discussed in further detail below.

Each of the approaches for restricting access to memory in the untrusted execution mode 220 may be similarly applied when the execution mode state indicator 310 indicates that the processor 300 is to operate in the further-restricted execution mode 230. For instance, the memory system 330, when operating in the further-restricted execution mode 230, may further restrict access to memory by the processor 300 to a subset of memory segments or memory pages that are accessible to the processor 300 in the untrusted execution mode 220. Likewise, the memory system 330 may also define a subset of memory ranges accessible by the processor 300 in the untrusted execution mode 220 using one or more further-restricted untrusted execution mode base/bound register pairs. As previously indicated, example embodiments of the various techniques for restricting memory access based on an execution mode of the processor 300 are illustrated in FIGS. 6, 7 and 8 and discussed in further detail below.

FIG. 4 is a table 400 that illustrates an example embodiment of an instruction set, including example modifications to that instruction set. The table 400 may be used to implement the various execution modes illustrated in FIG. 2. In FIG. 4, the table 400 lists, for a set of instructions, whether each instruction is legal, illegal or changed for each of the execution modes 200-230 illustrated in FIG. 2. In certain embodiments, for example, the operations of one or more instructions of the trusted execution mode 210 instruction set may be changed when operating in the untrusted execution mode 220 and/or the further-restricted untrusted execution mode 230 to perform operations that facilitate transitioning a processor from the further-restricted untrusted execution mode 230 to the untrusted execution mode 220, or from the untrusted execution mode 220 to the trusted execution mode 210. In other embodiments, the respective operations of one or more instructions may be changed in different execution modes to perform different functions not related to transitioning between execution modes.

The table 400 may be implemented, for example, in the instruction processing module 320 of the processor 300 in a number of fashions. For instance, the table 400 may be implemented as a lookup table in the instruction processing module

Figure 5:
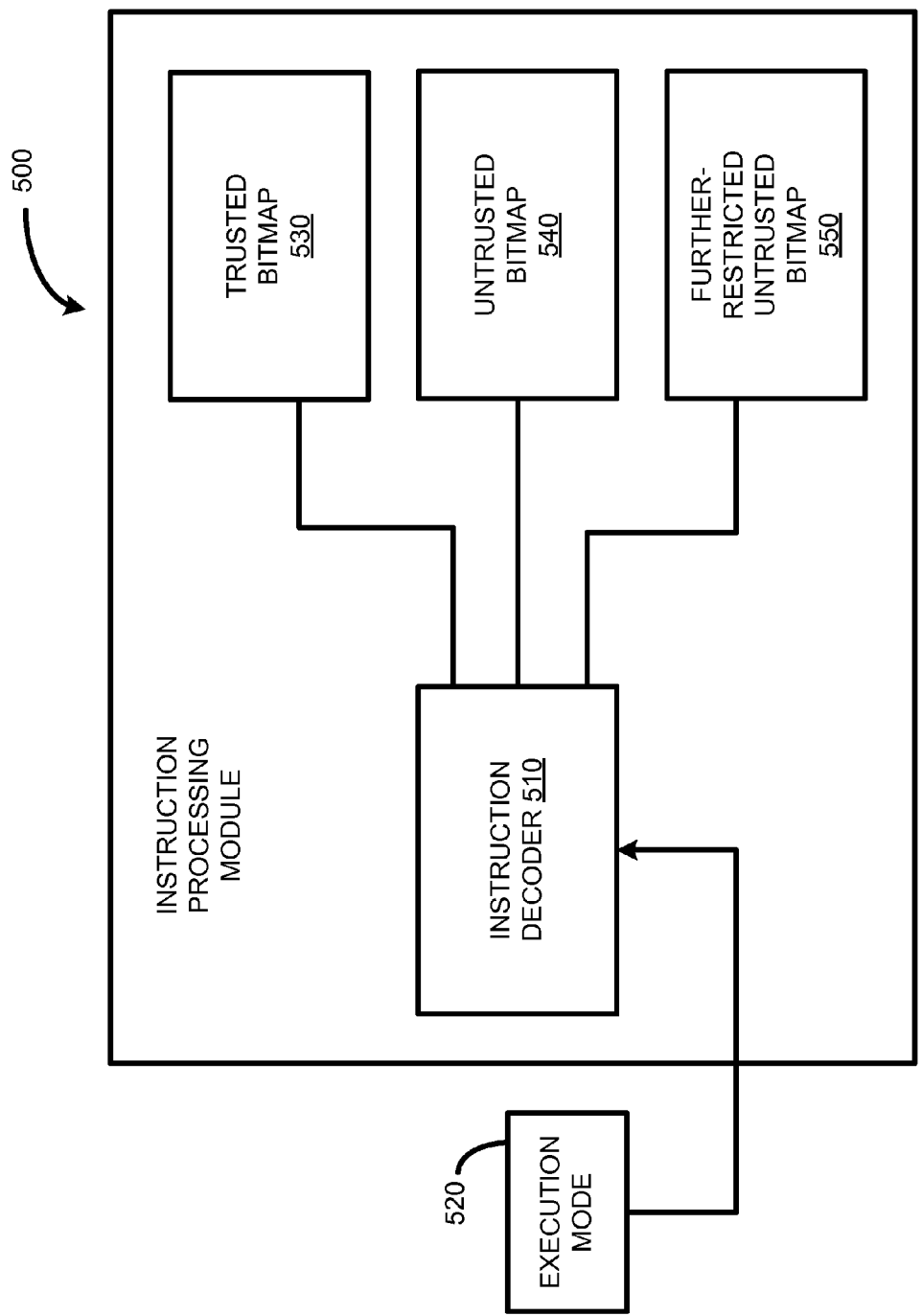
FIG. 5 is a block diagram illustrating an instruction processing module of a processor in accordance with an example embodiment.

320. In such an approach, the table 400 may be indexed using the instruction, or a field of the instruction, being decoded to determine the row of the table 400 and using the execution state information in the execution mode state indicator 310 to determine the appropriate column of the table 400. In an example embodiment, the table 400 may be implemented in the instruction processing module 320 of the processor using a content addressable memory (CAM). In other embodiments, an instruction bitmap may be used to designate whether an instruction is legal, illegal or changed in a particular execution mode. Such an approach is illustrated in FIG. 5 and is described in further detail below.

As illustrated in FIG. 4, each instruction of a processor's instruction set may be defined as being legal, illegal or changed in each execution mode. For a changed instruction, the operation of the instruction could be changed as compared to the operation of the instruction at a higher level of trust. For instance, "Instruction 5" in the table 400 is legal in kernel mode, and trusted mode, but is changed in untrusted mode and further-restricted untrusted mode. As was discussed above, the respective operation of "Instruction 5" may be changed in the untrusted mode and the further-restricted untrusted mode (as compared to operation in the kernel mode and the trusted execution mode) to an operation that facilitates transitioning from the further-restricted untrusted execution mode 230 to the untrusted execution mode 220, or from the untrusted execution mode 220 to the trusted execution mode 210. In other embodiments, the operation of "Instruction 5" may be changed in the untrusted mode and the further-restricted untrusted mode to simply perform a different function than in the kernel mode and the trusted mode.

As is also shown in FIG. 4, "Instruction 1" is legal in kernel mode, but is illegal in trusted mode, untrusted mode and further-restricted untrusted mode. In this situation, "Instruction 1" may be an instruction that relates to creation of memory segments, memory page definition or other instructions that, for security reasons (i.e., to prevent the introduction of malware or corruption to a computing system) would only be performed by a processor when operating in its most trusted (kernel) execution mode.

As also shown in FIG. 4, "Instruction 2" is legal in kernel mode and trusted mode, but is illegal in untrusted mode and further-restricted untrusted mode. Such an instruction may be, as was discussed above, a syscall instruction. As some other alternatives, "Instruction 2" may be a far-call instruction, a halt instruction, an instruction that modifies memory segment state or a memory page table, or an inter-segment or inter-page instruction.

As is also shown in FIG. 4, "Instruction 4" is designated as legal in kernel mode, trusted mode and untrusted mode, but is designated as illegal in further-restricted untrusted mode. Such instructions may be instructions related to cryptography, backward branch instructions, and control-flow transfer instructions to dynamically computed targets, as some examples. The specific instructions that may be made illegal would depend on the specific embodiment.

FIG. 5 is a block diagram illustrating an instruction processing module 500 in accordance with an example embodiment. The instruction processing module 500 may be included in the processor 300 (as instruction processing module 320) and used to implement the example modified instruction set illustrated in FIG. 4 in order to implement different execution modes, such as the execution modes illustrated in FIG. 2 and described herein. As shown in FIG. 5, the instruction processing module 500 includes an instruction decoder 510. The instruction decoder 510 may receive execution mode state information 520 in order to select an instruction bitmap to refer to during instruction decoding. The execution mode state information 520 may be provided to the instruction decoder 510 from an execution mode state indicator, such as the execution mode state indicator 310, which was described above with respect to FIG. 3. In other embodiments, the execution state information 520 may be provided to the instruction processing module 500 and/or the instruction decoder 510 in a number of other appropriate fashions.

Based on the execution state information 520, as was indicated above, the instruction decoder 510 may decode instructions by referring to one of the instruction bitmaps 530-550 included in the instruction processing module 500. For instance, the table 400 of FIG. 4 may be implemented in the instruction processing module 500 using the bitmaps 530-550. For instance, the instruction designations in the trusted execution mode column of the table 400 may be included in the trusted bitmap 530. Similarly, the instructions designations in the untrusted execution mode column of the table 400 may be implemented in the untrusted bitmap 540. In like fashion, the instruction designations in the further-restricted untrusted mode column of the table 400 may be implemented in the further-restricted untrusted mode bitmap 550. Using such an approach, the instruction decoder 510 would decode instructions with reference to the appropriate bitmap based on the execution mode state information 520 provided to the instruction processing module 500 and/or the instruction decoder 510.

In certain embodiments, the instruction bitmaps of the instruction processing module 500 may be produced by logically ANDing an instruction bitmap for a given execution mode with an instruction bitmap for an execution mode with the next higher level of trust. For instance, the untrusted bitmap 540 may be produced by logically ANDing a bitmap that indicates the modifications to a processor instruction set between the trusted mode and the untrusted mode with the trusted bitmap 530. In other embodiments, each execution mode may have its own unique instruction bitmap and logical operations would not be performed to produce the instruction bitmaps 530-550. Also, depending on the particular embodiment, the instruction bitmaps may be fixed in read-only memory or, alternatively, may be writeable (such as part of a boot sequence) in order to allow for flexibility in designating which instruction are legal, illegal or have changed operations in the various execution modes.

FIG. 6 is a block diagram illustrating a memory system 600 in accordance with an example embodiment that may be included in the processor 300 and used to restrict access to memory when operating in various execution modes. The memory system 600 may be used in the processor 300 illustrated in FIG. 3 as the memory system 330. Further, the memory system 600 may be used to restrict memory access in various execution modes, such as the execution modes described above with reference to FIG. 2, in processor architectures that utilize memory segmentation to allocate memory in a computing system.

As shown in FIG. 6, the memory system 600 may include a memory management unit 610. The memory management unit 610 may receive execution mode state information 620 in a number of ways, such as using the approaches described herein. Based on the execution mode state information 620, the memory management unit 610 may operate using a memory segment table that defines memory segments that are accessible by a processor in an execution mode that corresponds with the execution mode state information.

For instance, if the execution mode state information 620 indicates that the processor is operating in a trusted execution mode, the memory management unit 610 may use a trusted segment table 630 to determine memory segments that are valid and/or accessible by the processor in the trusted execution mode and whether those segments are read-only or read-write accessible. Likewise, if the execution mode state information 620 indicates that a processor is operating in an untrusted execution mode, the memory management unit 610 may use an untrusted segment table 640 to determine which memory segments are valid in the untrusted execution mode. In like fashion, if the execution mode state information 620 indicates that a processor is operating in a further-restricted untrusted execution mode, the memory management unit 610 may use a further-restricted untrusted segment table 650 to determine which memory segments are valid in the further-restricted untrusted execution mode. In such embodiments, if untrusted code tries to access a memory location that is not defined, in a corresponding memory segment table, as being accessible in a current execution mode, the memory management unit 610 may be configured to treat the memory access request as an attempt to reference a protected memory location.

FIG. 7 is a block diagram illustrating a memory system 700 in accordance with an example embodiment that may be included in the processor 300 and used to restrict access to memory when operating in various execution modes. The memory system 700 may be used in the processor 300 illustrated in FIG. 3 as the memory system 330. Further, the memory system 700 may be used to restrict memory access in various execution modes, such as the execution modes described above with reference to FIG. 2, in processor architectures that utilize memory page tables to allocate memory in a computing system.

As shown in FIG. 7, the memory system 700 may include a memory controller 710. The memory controller 710 may receive execution mode state information 720 in a number of ways, such as using the approaches described herein. Based on the execution mode state information 720, the memory controller 710 may operate using a memory page table that defines memory pages that are accessible by a processor in an execution mode that corresponds with the execution mode state information.

For instance, if the execution mode state information 720 indicates that the processor is operating in a trusted execution mode, the memory controller 710 may use a trusted page table 730 to determine memory pages that are valid and/or accessible by the processor in the trusted execution mode and whether those memory pages are read-only or read-write accessible. Likewise, if the execution mode state information 720 indicates that a processor is operating in an untrusted execution mode, the memory controller 710 may use an untrusted page table 740 to determine which memory pages are valid in the untrusted execution mode. In like fashion, if the execution mode state information 720 indicates that a processor is operating in a further-restricted untrusted execution mode, the memory controller 710 may use a further-restricted untrusted page table 750 to determine which memory pages are valid in the further-restricted untrusted execution mode. In such embodiments, if untrusted code tries to access a memory location that is not defined, in a corresponding memory page table, as being accessible in a current execution mode, the memory controller 710 may be configured to treat the memory access request as an attempt to reference a protected memory location.

FIG. 8 is a block diagram illustrating a memory system 800 in accordance with an example embodiment that may be included in the processor 300 and used to restrict access to memory when operating in various execution modes. The memory system 800 may be used in the processor 300 illustrated in FIG. 3 as the memory system 330. Further, the memory system 800 may be used to restrict memory access in various execution modes, such as the execution modes described above with reference to FIG. 2, using one or more respective base/bound register pairs to define valid memory location for each execution mode. Base/bound register pairs may define valid memory ranges using a base memory address that is stored in the base register of a given pair and a bound value that is either an absolute memory address, or a size of the memory range that is used as a relative bound address in conjunction with the base address.

For example, one gigabyte memory range may be defined in a base/bound register pair by storing a base address in the base register. As an example, the base address may be an absolute address of 0x40000000h. The bound register, for a one gigabyte memory range may be defined absolutely as 0x80000000h or relatively as 0x40000000h. The relative bound of 0x40000000h would then be combined with the base address of 0x40000000h to produce an upper bound of 0x80000000h. Either approach may be implemented in the memory system 800.

As shown in FIG. 8, the memory system 800 may include a memory controller 810. The memory controller 810 may receive execution mode state information 820 in a number of ways, such as using the approaches described herein. Based on the execution mode state information 820, the memory controller 810 may operate using memory base/bound register pairs to define memory address that are accessible by a processor in an execution mode that corresponds with the execution mode state information 820. Each execution mode may have one or more base/bound register pairs associated with it in the memory system 800.

For instance, if the execution mode state information 820 indicates that the processor is operating in a trusted execution mode, the memory controller 810 may use trusted base/bound register pairs 830 to determine memory ranges that are valid and/or accessible by the processor in the trusted execution mode. Likewise, if the execution mode state information 820 indicates that a processor is operating in an untrusted execution mode, the memory controller 810 may use untrusted base/bound register pairs 840 to determine memory ranges that are valid and/or accessible by the processor in the untrusted execution mode. In like fashion, if the execution mode state information 820 indicates that a processor is operating in a further-restricted untrusted execution mode, the memory controller 810 may use further-restricted untrusted base/bound register pairs 850 to determine memory ranges that are valid and/or accessible by the processor in the further-restricted untrusted execution mode. In such embodiments, if untrusted code tries to access a memory location that is not defined, in a corresponding base/bound register pair, as being accessible in a current execution mode, the memory controller 810 may be configured to treat the memory access request as an attempt to reference a protected memory location.

In embodiments such as the memory system 800, a processor that includes the memory system 800 may be configured to determine appropriate base/bound register values for the various execution modes and write those values when the processor enters a given execution and/or as part of a boot process. In other embodiments, the values stored in the base/bound register pairs 830-850 may be fixed for a given processor architecture and memory configuration and may be permanently stored in the processor (i.e., using read-only memory structures) or, as one alternative, be written into the appropriate base/bound registers as part of a boot sequence and not changed during operation of the processor.

Figure 9:
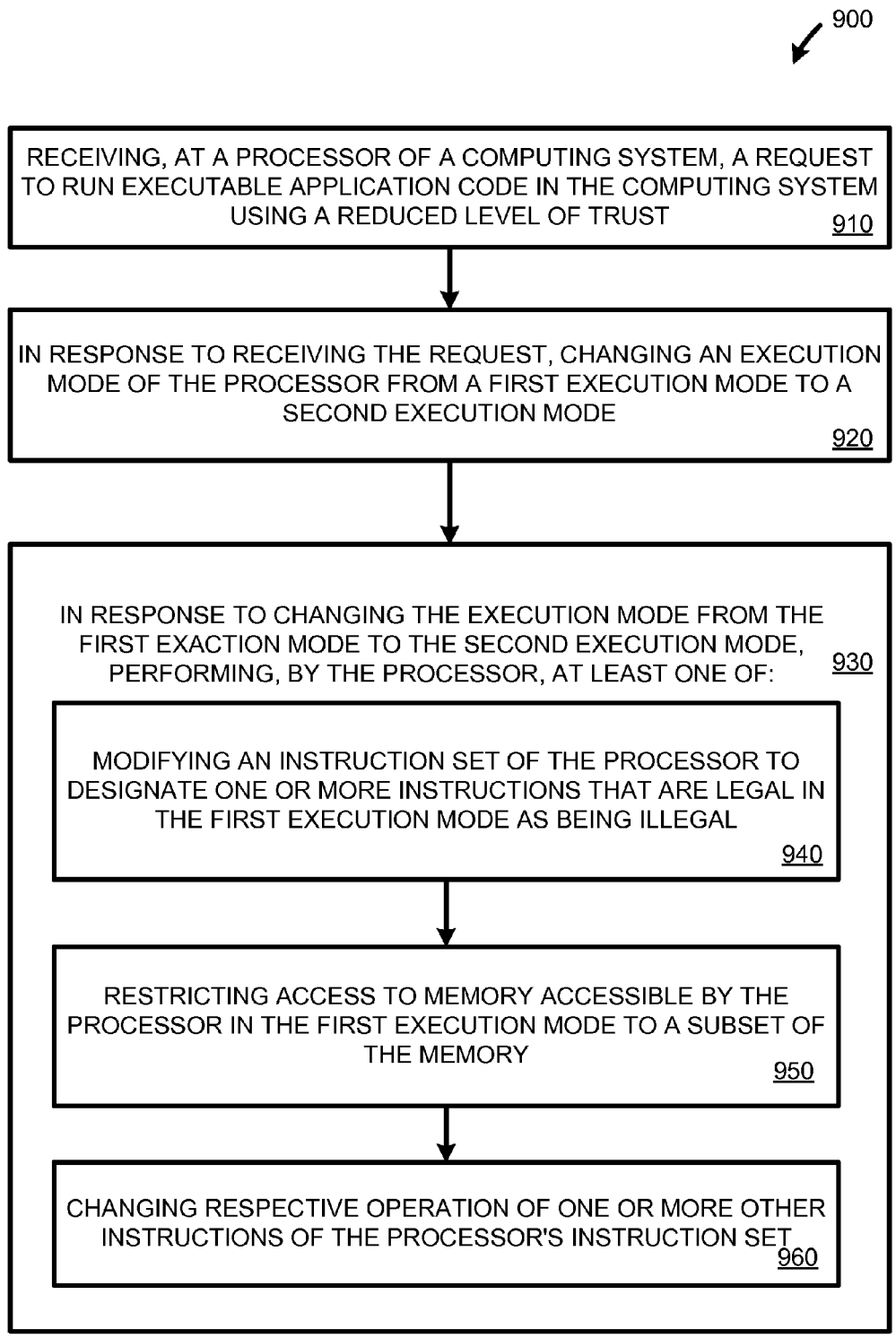
FIG. 9 is a flowchart illustrating a method of delivering untrusted executable application code in accordance with an example embodiment.

FIG. 9 is a flowchart illustrating a method 900 of delivering untrusted executable application code to a computing system in accordance with an example embodiment. The method 900 may be implemented using the apparatus that were described above with respect to FIGS. 1-8. Alternatively, other apparatus may be used to implement the method 900.

The method 900 includes, at block 910, receiving, at a processor of a computing system, a request to run executable application code in the computing system using a reduced level of trust. At block 920, the method 900 includes, in response to receiving the request, changing an execution mode of the processor from a first execution mode to a second execution mode, such as from a trusted execution mode to an untrusted execution mode or from an untrusted execution mode to a further-restricted untrusted execution mode, as two examples. This change may be accomplished, for example, by a processor changing execution state information stored, for example, in an execution mode state indicator, such as was described above with respect to FIG. 3.

At block 930, the method 900 includes operations 940-960, which at least one of is performed, e.g., by a processor, in response to changing the execution mode from the first execution mode to the second execution mode. At block 940, the method 900 includes modifying an instruction set of the processor to designate one or more instructions that are legal in the first execution mode as being illegal, such as in the fashions described above with respect to FIGS. 3, 4 and 5, for example. At block 950, the method 900 includes restricting access to memory accessible by the processor in the first execution mode to a subset of the memory, such as in the fashions described above with respect to FIGS. 3, 6, 7 and 8, for example.

At block 960, the method 900 includes changing respective operation of one or more other instructions of the processor's instruction set, such as was illustrated and described above with respect to FIG. 4, for example. For instance, one or more instructions may be modified to operate so as to facilitate a processor transitioning from a lower trust level to a higher trust level, such as transitioning from a further-restricted untrusted execution mode to an untrusted execution mode; or transitioning from an untrusted execution mode to a trusted execution mode. Of course, other instructions may be changed to simply perform different operations at lower trust levels, as compared with their operation at higher trust levels.

Figure 10:
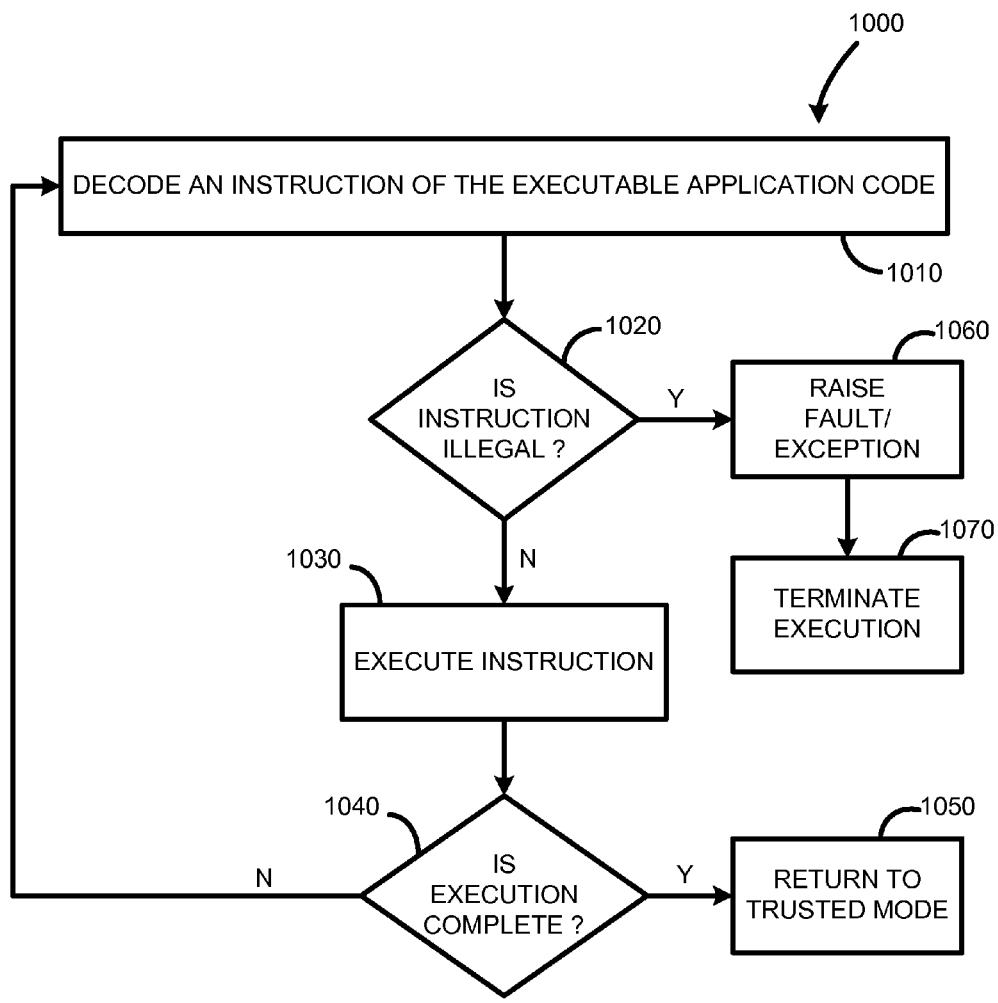
FIG. 10 is a flowchart illustrating a method of executing untrusted executable application code in accordance with an example embodiment.

FIG. 10 is a flowchart illustrating a method 1000 for executing untrusted executable application code (e.g., in an untrusted execution mode, in further-restricted untrusted execution mode, or in some other reduced trust execution mode) in accordance with an example embodiment. For purposes of illustration, the method 1000 will be described in the context of executing untrusted code in an untrusted execution mode, such as the untrusted execution mode 220 discussed above with respect to FIG. 2. In other embodiments, the method 1000 may be used to execute untrusted code at a number of reduced trust levels.

The method 1000 includes, at block 1010, decoding an instruction of the untrusted executable application code. At block 1020, a determination is made (e.g., by an instruction decoder) whether the decoded instruction is illegal in the current execution mode. If it is determined at block 1020 that the decoded instruction is not illegal in the current execution mode, the method continues to block 1030.

At block 1030, the method 1000 includes executing the decoded instruction, such as in accordance with a lookup table, such as the table 400 illustrated in FIG. 4. Alternatively, a determination as to the specific operation to be performed by the decoded instruction may be made when the instruction is decoded (e.g., in accordance with the table 400, for example).

The method 1000 then continues to block 1040. At block 1040, the method 1000 includes determining whether execution of the untrusted code is complete. If execution is complete, the method 1000 continues to block 1050 and execution returns to a trusted execution mode. In other situations, execution may return from a further-restricted untrusted execution mode to an untrusted execution mode. The specific sequence of events may depend on the particular untrusted code being executed and/or the particular processor that is used to execute the untrusted code. If it is determined, at block 1040, that execution of the untrusted code is not complete, the method 1000 returns to block 1010 and a next instruction of the untrusted code is decoded and the operations of the method 1000 are carried out for this next instruction.

If it is determined, at block 1020, that the decoded instruction is designated as illegal (i.e., by an instruction decoder), the method 1000 continues to block 1060. At block 1060, the method 1000 includes raising a fault or exception in a processor that is used to implement the method. In response to this fault or exception, the method 1000 includes, at block 1070, handling the fault by terminating execution of the untrusted code. Such fault handling is typically handled in software, though other approaches are possible. Once execution of the untrusted code is terminated, the processor may return control-flow processing to a location in a trusted code base and change the execution mode state information (e.g., in an execution mode state indicator) to indicate that the processor is operating in a trusted execution mode.

Figure 11:
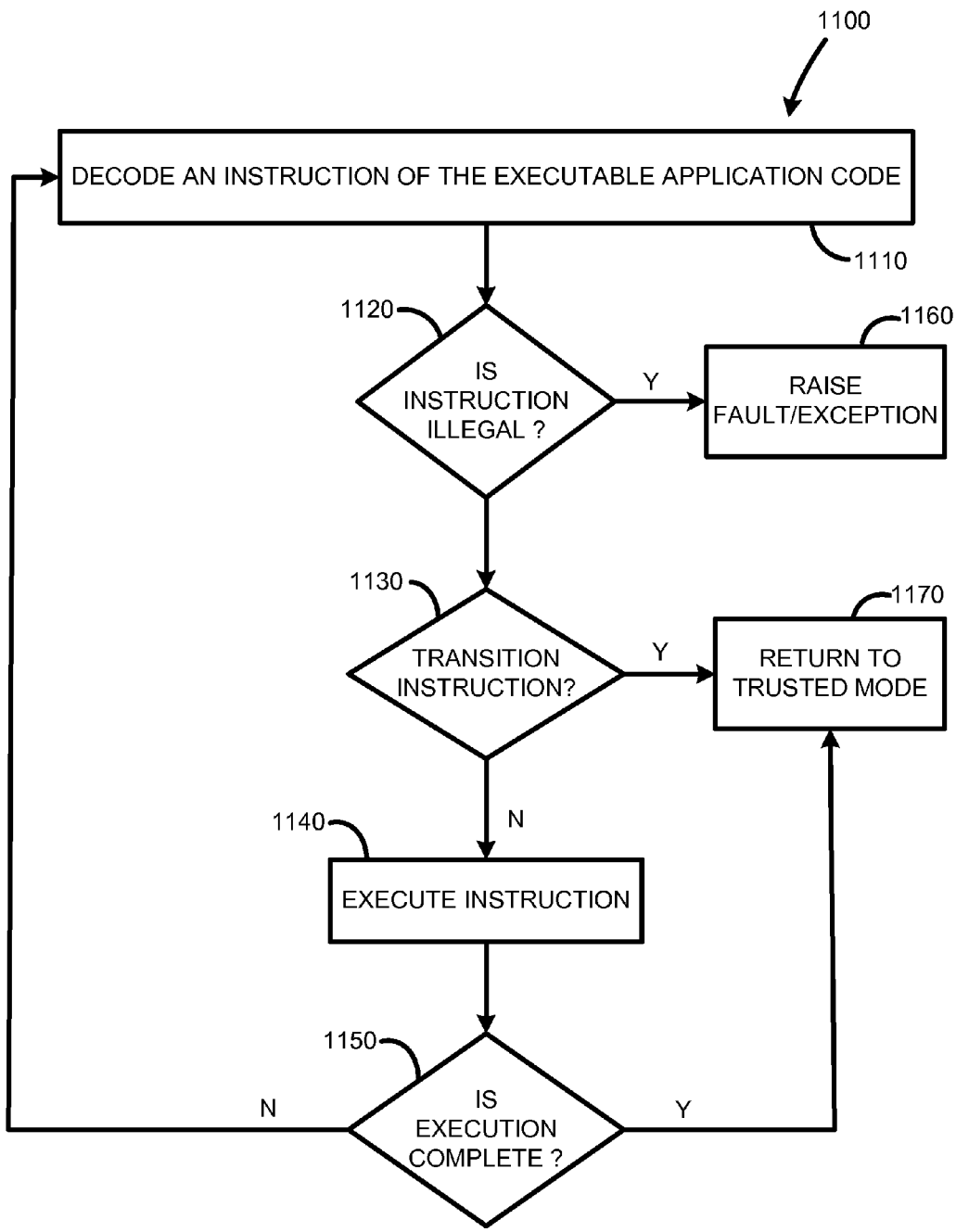
FIG. 11 is a flowchart illustrating a method of executing untrusted executable application code in accordance with another example embodiment.

FIG. 11 is a flowchart illustrating a method 1100 of executing untrusted executable application code in accordance with another example embodiment. In the method 1100, the operations 1110, 1120, 1140, 1150 and 1160 are substantially the same as their respective operations 1010, 1020, 1030, 1040 and 1060 in the method 1000 illustrated in FIG. 10. For purposes of brevity, these operations are not described in detail again with respect to the method 1100.

However, in contrast to the method 1000, the method 1100 includes, at block 1130, determining whether the decoded instruction (decoded at block 1110) is a transition instruction, such as was described with respect to FIG. 4 above. If it is determined, at block 1130, that the decoded instruction is a transition instruction, the method 1100 continues to block 1170. At block 1170, a processor implementing the method 1100 may transition from an untrusted execution mode to a trusted execution mode. In other embodiments, the processor may transition from a further-restricted untrusted execution mode to an untrusted execution mode or a trusted execution mode, depending on the particular situation. In still other embodiments, the processor may transition from an execution mode having a lower level of trust to an execution mode having a higher level of trust.

In the method 1110, if it is determined, at block 1150, that execution of a block of untrusted code is complete, the method 1100 continues to block 1170 and a processor implementing the method 1100 may return to a trusted execution mode from an untrusted execution mode or a further-restricted untrusted execution mode. In other embodiments, the processor may transition from the further-restricted untrusted execution mode to the untrusted execution mode as a result of determining, at block 1150, that execution of a block of untrusted code is complete.

Figure 12:
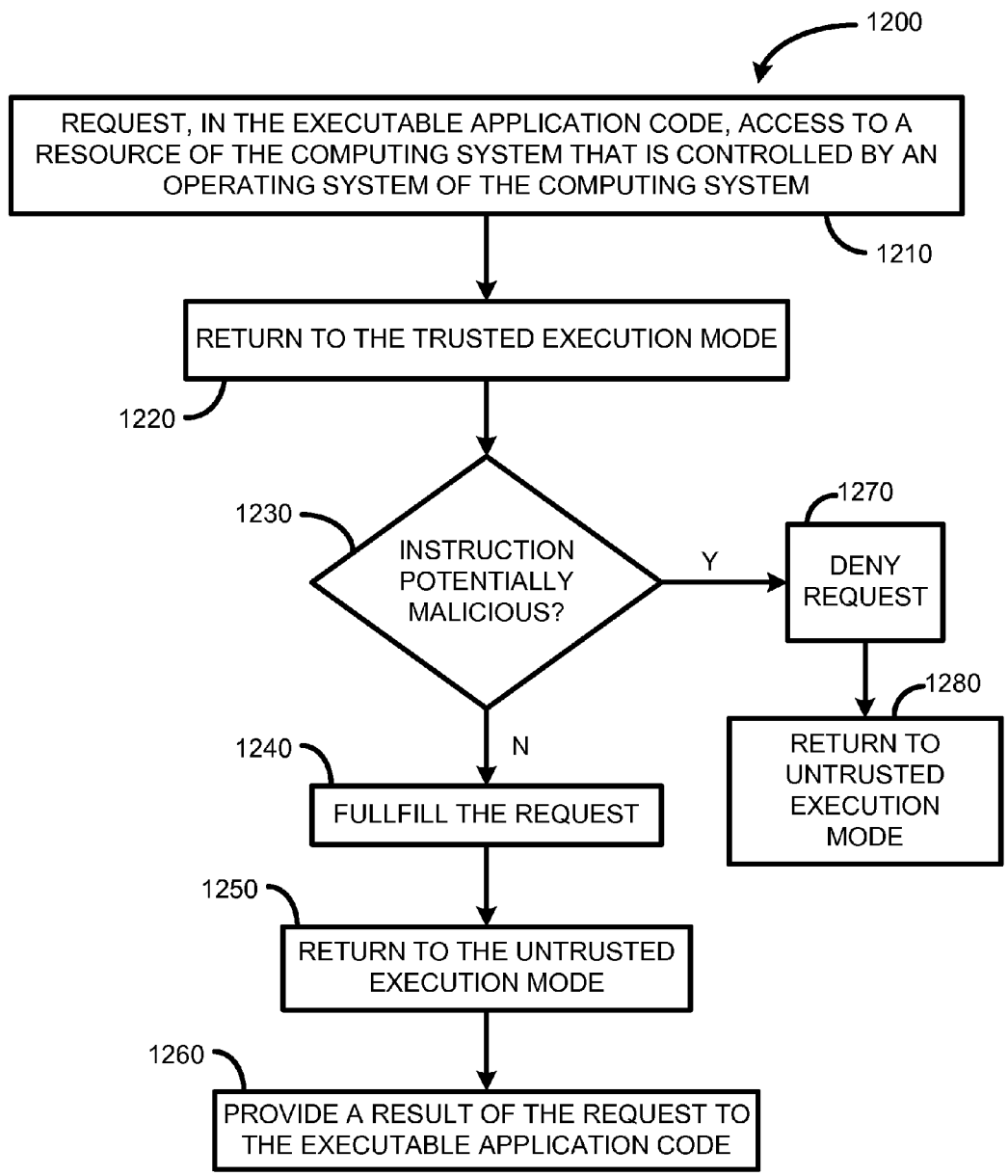
FIG. 12 is a flowchart illustrating a method of requesting access to a system resource by untrusted executable code in accordance with an example embodiment.

FIG. 12 is a flowchart illustrating a method 1200 of requesting access to a system resource by untrusted executable code in accordance with an example embodiment. For purposes of illustration, the method 1200 will be described with reference to a trusted execution mode and an untrusted execution mode, such as described above. It will be appreciated, however, that the method 1200 may be applied in conjunction with execution modes having other trust levels.

The method 1200 includes, at block 1210, the untrusted code requesting access to a resource of the computing system that is controlled by an operating system of a computing system in which the method 1200 is being implemented. At block 1220, the method includes returning to the trusted execution mode to determine if the request should be fulfilled or not. At block 1230, the method 1200 includes determining, using one or more instructions in a trusted code base (e.g., code locally installed on the computing system) whether the instruction in which the request was included is potentially malicious (e.g., could be used to place malware on the computing system).

If it is determined, at block 1230, that the request (or an instruction including the request) is not potentially malicious, the method 1200 continues to block 1240. At block 1240, the method 1200 includes fulfilling the request and the method continues to block 1250. At block 1250, the method 1200 includes returning to the untrusted execution mode (or a further-restricted untrusted execution mode) at a control-flow point where the request was made at block 1210. At block 1260, the method 1200 includes providing the results of the request (if any) to the untrusted code.

If it is determined, at block 1230, that the request made at block 1210 is potentially malicious (e.g., it is a request to write to a block of memory not accessible in the untrusted execution mode), the method 1200 continues to block 1270. At block 1270, the method 1200 includes, denying the request (e.g., using one or more instructions in the trusted code base). The method 1200 then continues to block 1280, where control-flow is returned to the point in the untrusted code where the request was made. At this point, the processor could make a decision to continue execution of the untrusted code or, alternatively, the processor could make a decision to terminate execution of the untrusted code as a result of the request being potentially malicious. If the processor decides to terminate the untrusted code, the processor may then return to the trusted execution mode and select a safe control-flow point to resume execution in the trusted code base. Examples of such safe control-flow points may be locations associated with error handlers or fault handlers.

Figure 13:
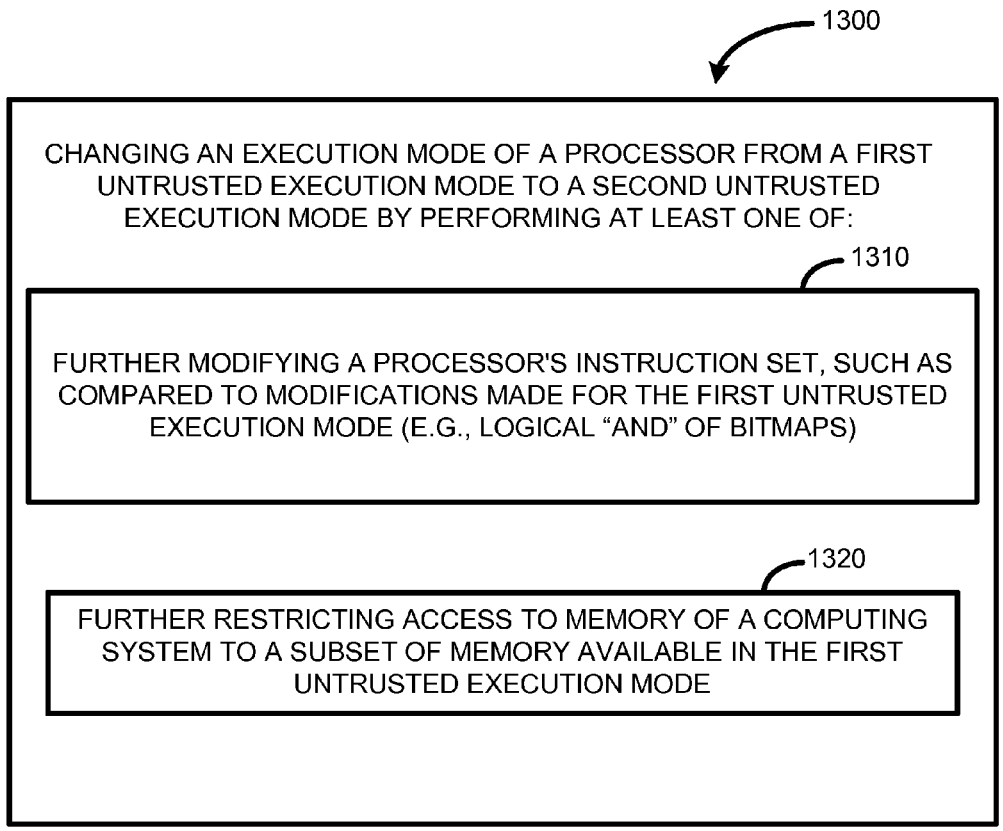
FIG. 13 is a flowchart illustrating a method of changing from an untrusted execution mode to a further-restricted untrusted execution mode in accordance with an example embodiment.

FIG. 13 is a flowchart illustrating a method 1300 of changing an execution mode of a processor from a first untrusted execution mode to a second untrusted execution mode in accordance with an example embodiment. In the method 1300, the second untrusted execution mode has a lower trust level than the first untrusted execution mode. In the method 1300, a processor may change from operating in the first untrusted execution mode to operating in the second untrusted execution mode as a result of changing execution state information that is stored, for example, in an execution mode state indicator, as in like fashion as was previously described with respect to FIG. 9. The method 1300 may be used, for example, to transition a processor from operating in the untrusted execution mode 220 to the further-restricted untrusted execution mode 230, as discussed above with respect to FIG. 2.

As part of changing the execution mode, the method 1300 includes, at block 1310, further modifying a processor's instruction set, such as compared to modifications made for the first untrusted execution mode. For example, the modifications at block 1310 may be modifications that are incremental to modifications made when changing from a trusted execution mode to the untrusted execution mode. The modifications made at block 1310 may designate one or more additional instructions of a trusted execution mode instruction set as being illegal in the further-restricted untrusted execution mode.

As was discussed above with respect to FIG. 5, further modifying the trusted execution mode instruction set may be accomplished by logically ANDing a first bitmap indicating the one or more instructions designated as illegal in the untrusted execution mode and a second bitmap indicating the one or more additional instructions designated as illegal in the further-restricted untrusted execution mode. In other embodiments, the bitmaps may also indicate instructions that have changed operations in the untrusted execution mode and/or the further-restricted untrusted execution mode, as compared with their operations in the trusted execution mode.

The method 1300 also includes, at block 1320 further restricting access to memory of a computing system to a subset of memory available in the first untrusted execution mode. As was discussed above with respect to FIGS. 6-8, a number of techniques may be used to further restrict the memory that is accessible to a processor when operating in the second untrusted execution mode.

Figure 14:
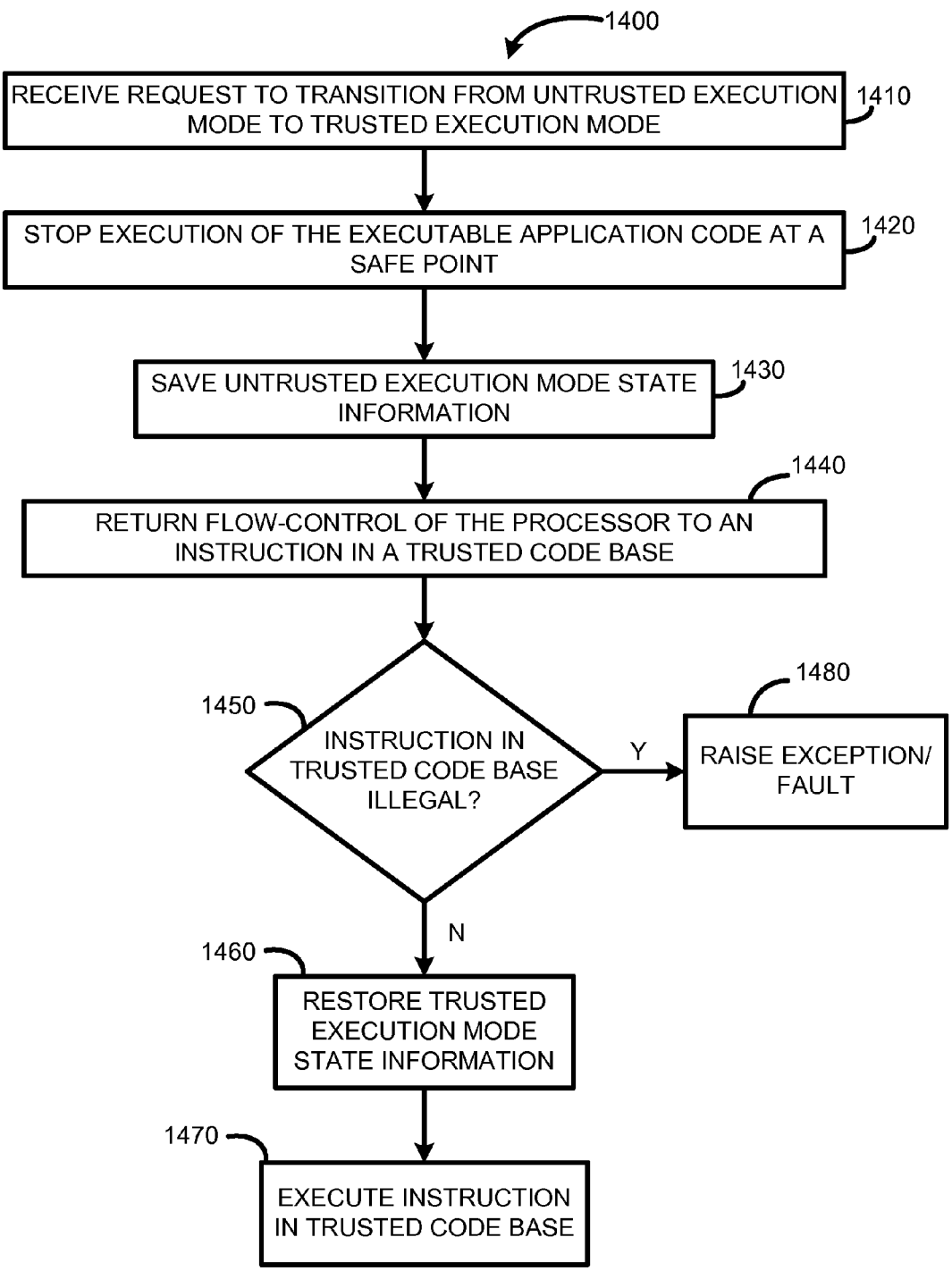
FIG. 14 is a flowchart illustrating a method changing from an untrusted execution mode to a trusted execution mode in accordance with an example embodiment.

FIG. 14 is a flowchart illustrating a method 1400 for changing from an execution mode having a lower level of trust to an execution mode having a higher level of trust in accordance with an example embodiment. For purposes of illustration, the method 1400 will be described with reference to changing from an untrusted execution mode to a trusted execution mode, such as the execution modes discussed above. It will be appreciated that a similar approach to the method 1400 may be used to change from a further-restricted execution mode to an untrusted execution mode or to a trusted execution mode; or to transition from a less trusted execution mode to an execution mode with a higher level of trust.

The method 1400 includes, at block 1410, receiving a request to transition from the untrusted execution mode to the trusted execution mode. As one example, request to access protected resources of a computing system may cause a transition from the untrusted execution mode to the trusted execution mode. Such a request may be made using an instruction whose operation was changed to facilitate this transition, such as was discussed above with respect to FIG. 4, for example.

At block 1420, the method 1400 includes stopping execution of the executable application code at a safe point, such as at a transition instruction. At block 1430, the method 1400 includes saving untrusted execution mode state information. Such state information may include saving status register values onto a stack, including the program counter and a stack pointer value once the status information is saved.

At block 1440, the method 1400 includes returning control-flow of a processor implementing the method 1400 to an instruction in a trusted code base. In order to prevent malicious activity from occurring when returning from the untrusted mode to the trusted mode, the return of control-flow may be limited to predefined "safe" locations in the trusted code base. At block 1450, the method 1400 includes restoring state information for the trusted execution mode, which may include changing the execution mode state to indicate that the processor is operating in the trusted execution mode, changing the program counter to correspond with the location in the trusted code base to which control-flow was returned, and change the stack pointer to indicate a stack location for the trusted execution mode, which could have been saved when the processor transitioned from the trusted execution mode to the untrusted execution mode. At block 1460, the method 1400 includes executing the instruction corresponding with the restored value of the program counter.

Figure 15:
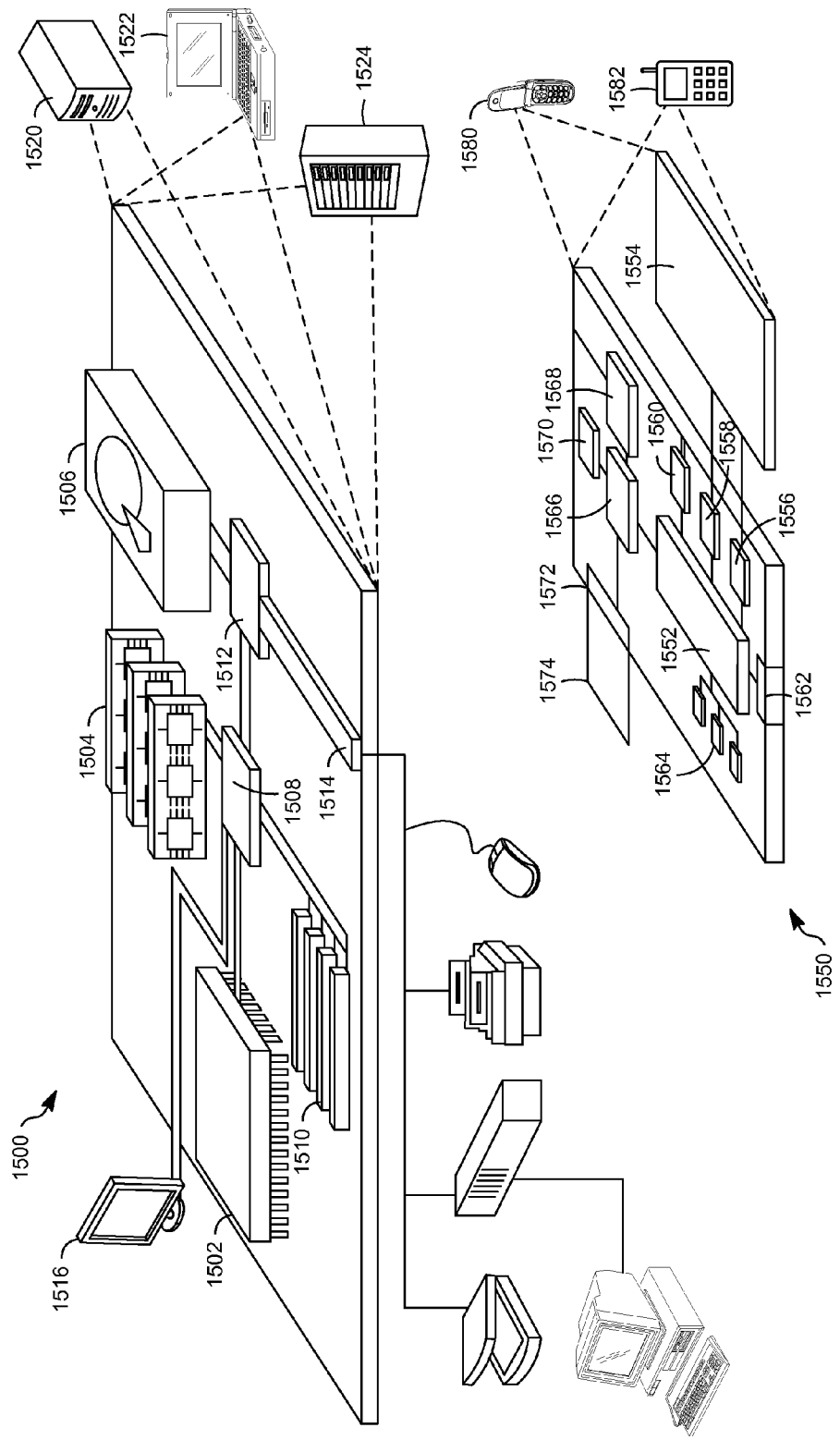
FIG. 15 shows an example of a computing device and a mobile computing device that may be used to implement the techniques described herein.

FIG. 15 is a diagram that shows an example of a generic computer device 1500 and a generic mobile computer device 1550, which may be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, which may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:
1. A method comprising:
loading, an untrusted executable application code for execution on a computing system, wherein the untrusted executable application code is received from an untrusted source;
in response to loading the untrusted executable application code, receiving, at a processor of the computing system, a request to run the untrusted executable application code in the computing system using a reduced level of trust;
in response to receiving the request, changing an execution mode of the processor from a first execution mode to a second execution mode; and
in response to changing the execution mode from the first execution mode to the second execution mode:
modifying, by the processor, an instruction set of the processor to designate one or more instructions that are legal in the first execution mode as being illegal, wherein the modification of the instruction set is per- formed by using one of a lookup table, a content addressable memory, or an instruction bitmap; and restricting, by the processor, access to memory accessible by the processor in the first execution mode to a subset of the memory, wherein the restriction of the memory is performed using one or more segment tables.

2. The method of claim 1, wherein modifying the instruction set of the processor comprises designating instructions that invoke an operating system of the computing system as illegal in the second execution mode.

3. The method of claim 1, wherein modifying the instruction set of the processor comprises designating instructions that access one or more resources of the computing system as illegal in the second execution mode.

4. The method of claim 1, wherein the one or more instructions designated as illegal include at least one of a syscall instruction, a far-call instruction and a halt instruction.

5. The method of claim 1, further comprising:
executing the executable application code using the modified instruction set; and
terminating execution of the executable application code in response to an attempt to execute an instruction of the one or more instructions designated as illegal.

6. The method of claim 1, wherein an attempt to execute an instruction of the one or more instructions designated as illegal as part of the executable application code causes an exception to be raised in the processor.

7. The method of claim 1, wherein an attempt to execute an instruction of the one or more instructions designated as illegal as part of the executable application code causes execution of the executable application code to be terminated.

8. The method of claim 1, further comprising:
requesting, in the executable application code, access to a resource of the computing system that is controlled by an operating system of the computing system;
returning to the first execution mode;
determining, using one or more executable instructions in a trusted code base, if the request to access the operating system resource is suspected to be malicious;
in the event the request is suspected to be malicious:
denying the request; and
returning to the second execution mode; and
in the event the request is not suspected to be malicious:
fulfilling the request; and
returning to the second execution mode.

9. The method of claim 8, further comprising, in the event the request is not suspected to be malicious, providing a result of the request to the executable application code.

10. The method of claim 1, further comprising, in response to changing the execution mode from the first execution mode to the second execution mode, changing respective operation of one or more other instructions of the processor's instruction set.

11. The method of claim 10, wherein changing respective operation of the one or more other instructions of the processor's instruction set comprises changing the respective operation of the one or more other instructions to one or more respective operations for transitioning the computing system from the first execution mode to the second execution mode.

12. The method of claim 1, wherein changing the execution mode of the computing system from the first execution mode to the second execution mode comprises changing a state indicator in the processor.

13. The method of claim 1, wherein the subset of memory available in the second execution mode comprises one or more memory segments of the memory available in the first execution mode.

14. The method of claim 1, wherein restricting access to the memory of the computing system by the executable application code to the subset of memory available in the first execution mode comprises restricting access to memory addresses corresponding with respective memory address ranges specified, in the processor, by values stored in one or more base/bound register pairs associated with the second execution mode.

15. The method of claim 14, further comprising storing, by the processor, the respective memory address values in the one or more base/bound register pairs associated with the second execution mode in response to changing the execution mode of the computing system from the first execution mode to the second execution mode.

16. The method of claim 1, wherein the subset of memory available in the second execution mode comprises one or more memory pages of memory pages available in the first execution mode.

17. The method of claim 1, wherein restricting access to the memory of the computing system by the executable application code to the subset of memory available in the first execution mode comprises replacing, in the processor, a first execution mode memory page table with a second execution mode memory page table.

18. The method of claim 1, wherein modifying the processor's instruction set to designate the one or more instructions as being illegal comprises designating the one or more instructions as being illegal using an instruction bitmap.

19. The method of claim 1, further comprising:
changing an execution mode of the computing system from the second execution mode to a third execution mode including at least one of:
further modifying the processor's instruction set to designate one or more additional instructions of the processor's instruction set as being illegal in the third execution mode; and
further restricting access to the memory of the computing system to a subset of memory available in the second execution mode.

20. The method of claim 19, wherein further modifying the trusted execution mode instruction set comprises logically ANDing a first bitmap indicating the one or more instructions designated as illegal in the second execution mode and a second bitmap indicating the one or more additional instructions designated as illegal in the third execution mode.

21. The method of claim 1, further comprising executing, as part of the executable application code, an instruction that causes the processor to transition from the second execution mode to the first execution mode.

22. The method of claim 21, wherein transitioning from the second execution mode to the first execution mode comprises:
stopping execution of the executable application code at a safe point;
saving second execution mode state information;
returning control-flow of the processor to an instruction in a trusted code base;
determining whether the instruction in the trusted code base is an instruction of the one or more instructions designated as illegal; and
in the event the instruction in the trusted code base is not an instruction of the one or more instructions designated as illegal:

restoring first execution mode state information; and
executing the instruction in the trusted code base.

23. The method of claim 21, wherein, in the event the instruction in the trusted code base is an instruction of the one or more instructions designated as illegal, the method further includes raising an exception in the processor.

24. A processor comprising:
an execution mode state indicator having a plurality of states, the execution mode state indicator being configured such that:
placing the execution mode state indicator in a first state causes the processor to operate in a first execution mode; and
placing the execution mode state indicator in a second state causes the processor to operate in a second execution mode;
an instruction processing module configured to implement a set of instructions in the first execution mode and designate one or more instructions of the set of instructions as illegal instructions in the second execution mode, wherein the designation of the one or more instructions is performed by using one of a lookup table, a content addressable memory, or an instruction bitmap; and
a memory system configured to, in the second execution mode, restrict access to a set of memory addresses accessible by the processor in the first execution mode to a subset of the set of memory addresses, wherein the restriction of the memory is performed using one or more segment tables,
wherein the execution mode state indicator is placed in the second mode in response to a request to run, by the processor, executable application code using a reduced level of trust, and wherein the request at the processor is in response to loading an untrusted executable application code from an untrusted source for execution.

25. The processor of claim 24, wherein the execution mode state indicator is further configured such that placing the execution mode state indicator in a third state causes the processor to operate in a kernel execution mode.

26. The processor of claim 24, wherein:
the execution mode state indicator is further configured such that placing the execution mode state indicator in a third state causes the processor to operate in a third execution mode; and
the instruction processing module is further configured to designate one or more additional instructions of the set of instructions as illegal instructions in the third execution mode.

27. The processor of claim 24, wherein:
the execution mode state indicator is further configured such that placing the execution mode state indicator in a third state causes the processor to operate in a third execution mode; and
the memory system is further configured to restrict access to the subset of memory addresses accessible by the processor in the second execution mode to a further subset of memory addresses.

28. The processor of claim 24, wherein the execution mode state indicator is further configured to change from the first state to the second state in response to receiving a request to run executable code at a lower level of trust.

29. The processor of claim 24, wherein the instruction processing module comprises an instruction decoder, the instruction decoder being configured to decode the one or more instructions designated as illegal instructions as illegal when the processor is operating in the second execution mode.

30. The processor of claim 24, wherein the instruction processing module comprises a writeable instruction bitmap memory, the writeable instruction bitmap memory being configured to designate the one or more instruction as illegal based on a bitmap stored in the bitmap memory.

31. The processor of claim 24, wherein the processor restricts access to the subset of memory addresses by designating instructions that modify memory segment state as illegal.

32. The processor of claim 24, wherein the memory system comprises one or more base/bound register pairs, the one or more base/bound register pairs being configured to specify the subset of memory addresses accessible by the processor in the second execution mode as one or more respective memory address ranges.

33. The processor of claim 24, wherein the instruction processing module is further configured to, in response to placing the execution mode state indicator in the second state, change respective operation of one or more other instructions of the set of instructions.

34. The processor of claim 33, wherein changing the respective operation of the one or more other instructions of the set of instructions comprises changing the respective operation of the one or more other instructions to one or more respective operations for transitioning the processor from the second execution mode to the first execution mode.

35. A method comprising:
loading, an untrusted executable application code for execution on a computing system, wherein the untrusted executable application code is received from an untrusted source;
in response to loading the untrusted executable application code, receiving, at a processor of the computing system, a request to run the untrusted executable application code in the computing system using a reduced level of trust;
in response to receiving the request, changing an execution mode of the processor from a first execution mode to a second execution mode; and
in response to changing the execution mode from the first execution mode to the second execution mode:
modifying, by the processor, an instruction set of the processor to designate one or more instructions that are legal in the first execution mode as being illegal, wherein the modification of the instruction set is performed by using one of a lookup table, a content addressable memory, or an instruction bitmap;
restricting, by the processor, access to memory accessible by the processor in the first execution mode to a subset of the memory, wherein the restriction of the memory is performed using one or more segment tables; and
changing respective operation of one or more other instructions of the processor's instruction set.

36. A processor comprising:
an execution mode state indicator having a plurality of states, the execution mode state indicator being configured such that:
placing the execution mode state indicator in a first state causes the processor to operate in a first execution mode; and
placing the execution mode state indicator in a second state causes the processor to operate in a second execution mode;

an instruction processing module configured to implement a set of instructions in the first execution mode and designate one or more instructions of the set of instructions as illegal instructions in the second execution mode, wherein the designation of the one or more instructions is performed by using one of a lookup table, a content addressable memory, or an instruction bitmap; and a memory system configured to, in the second execution mode, restrict access to a set of memory addresses accessible by the processor in the first execution mode to a subset of the set of memory addresses, wherein the restriction of the memory is performed using one or more segment tables, wherein the execution mode state indicator is placed in the second mode in response to a request to run, by the processor, loaded executable application code from an untrusted source using a reduced level of trust.

37. The method of claim 1, wherein the processor of the computing system is configured to execute in one of at least three execution modes: a kernel mode, a trusted execution mode, or an untrusted execution mode.

38. The method of claim 37, wherein the processor of the computing system is configured to execute in a fourth execution mode of a further untrusted execution mode.

* * * * *